(12) United States Patent
Ramacher et al.

(10) Patent No.: US 7,937,623 B2
(45) Date of Patent: May 3, 2011

(54) DIAGNOSABILITY SYSTEM

(75) Inventors: Mark Ramacher, San Carlos, CA (US); Gary Ngai, Saratoga, CA (US); Benoit Dageville, Foster City, CA (US); Karl Dias, Foster City, CA (US); Yair Sarig, San Mateo, CA (US); Marcus Fallen, Belmont, CA (US); Ajith Kumar Mysorenagarajarao, San Mateo, CA (US); John Beresniewicz, San Mateo, CA (US); Mike Feng, San Mateo, CA (US); Jonathan Klein, Redwood City, CA (US); Hailing Yu, Sunnyvale, CA (US); Leng Tan, Sunnyvale, CA (US); Balasubrahmanya Kuchibhotla, San Ramon, CA (US); Uri Shaft, Castro Valley, CA (US); Venkateshwaran Venkataramani, Sunnyvale, CA (US); Amir Valiani, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 266 days.

(21) Appl. No.: 12/252,056

(22) Filed: Oct. 15, 2008

(65) Prior Publication Data

US 2009/0106278 A1   Apr. 23, 2009

Related U.S. Application Data

(60) Provisional application No. 60/981,456, filed on Oct. 19, 2007.

(51) Int. Cl.
*G06F 11/00* (2006.01)

(52) U.S. Cl. .......................................... 714/37

(58) Field of Classification Search .............. 714/18–21, 714/26, 27, 37–39, 45–48
See application file for complete search history.

(56) References Cited

U.S. PATENT DOCUMENTS

| 4,866,635 | A | 9/1989 | Kahn et al. |
| 5,067,099 | A | 11/1991 | McCown et al. |
| 5,123,017 | A | 6/1992 | Simpkins et al. |

(Continued)

FOREIGN PATENT DOCUMENTS

EP   633536 A1   11/1995

OTHER PUBLICATIONS

Alexandru, M., et al., "An architectural system solution for technical diagnosis," pp. TuD5-17-TuD5-22, International Society of Information Fusion (ISIF), Copyright 2000. [Can also be found in Information Fusion 2000, Jul. 10-13, 2000, vol. 1.].

(Continued)

*Primary Examiner* — Nadeem Iqbal
(74) *Attorney, Agent, or Firm* — Kilpatrick Townsend & Stockton LLP

(57) ABSTRACT

A diagnosability system for automatically collecting, storing, communicating, and analyzing diagnostic data for one or more monitored systems. The diagnosability system comprises several components configured for the collection, storage, communication, and analysis of diagnostic data for a condition detected in monitored system. The diagnosability system enables targeted dumping of diagnostic data so that only diagnostic data that is relevant for diagnosing the condition detected in the monitored system is collected and stored. This in turn enables first failure analysis thereby reducing the time needed to resolve the condition detected in the monitored system.

20 Claims, 6 Drawing Sheets

U.S. PATENT DOCUMENTS

| | | | |
|---|---|---|---|
| 5,845,272 A | 12/1998 | Morjaria et al. | |
| 5,922,079 A | 7/1999 | Booth et al. | |
| 5,968,122 A | 10/1999 | Schlosser et al. | |
| 6,012,152 A | 1/2000 | Douik et al. | |
| 6,125,311 A | 9/2000 | Lo | |
| 6,182,249 B1 | 1/2001 | Wookey et al. | |
| 6,208,955 B1 | 3/2001 | Provan et al. | |
| 6,237,114 B1 | 5/2001 | Wookey et al. | |
| 6,243,628 B1 | 6/2001 | Bliley et al. | |
| 6,434,512 B1 | 8/2002 | Discenzo | |
| 6,519,552 B1 | 2/2003 | Sampath et al. | |
| 6,535,865 B1 | 3/2003 | Skaaning et al. | |
| 6,539,337 B1 | 3/2003 | Provan et al. | |
| 6,604,141 B1 * | 8/2003 | Ventura | 709/227 |
| 6,665,425 B1 | 12/2003 | Sampath et al. | |
| 6,681,215 B2 | 1/2004 | Jammu | |
| 6,697,810 B2 * | 2/2004 | Kumar et al. | 1/1 |
| 6,697,962 B1 | 2/2004 | McCrory et al. | |
| 6,738,811 B1 | 5/2004 | Liang | |
| 6,782,345 B1 | 8/2004 | Siegel et al. | |
| 6,862,698 B1 | 3/2005 | Shyu | |
| 6,892,317 B1 | 5/2005 | Sampath et al. | |
| 6,910,000 B1 | 6/2005 | Yedidia et al. | |
| 6,915,128 B1 * | 7/2005 | Oh | 455/424 |
| 6,944,800 B2 | 9/2005 | Brundridge et al. | |
| 6,983,200 B2 | 1/2006 | Bodin et al. | |
| 6,985,901 B1 | 1/2006 | Sachse et al. | |
| 7,079,010 B2 | 7/2006 | Champlin | |
| 7,100,083 B2 | 8/2006 | Little et al. | |
| 7,113,988 B2 | 9/2006 | Chirashnya et al. | |
| 7,124,328 B2 | 10/2006 | Bowers et al. | |
| 7,191,364 B2 | 3/2007 | Hudson et al. | |
| 7,257,744 B2 | 8/2007 | Sabet et al. | |
| 7,281,040 B1 | 10/2007 | Ly | |
| 7,281,170 B2 * | 10/2007 | Taylor et al. | 714/48 |
| 7,308,385 B2 | 12/2007 | Wegerich et al. | |
| 7,313,735 B1 | 12/2007 | Levergood et al. | |
| 7,328,376 B2 | 2/2008 | McGuire et al. | |
| 7,392,430 B2 | 6/2008 | Greenlee et al. | |
| 7,516,362 B2 | 4/2009 | Connelly et al. | |
| 7,525,910 B2 | 4/2009 | Wen | |
| 7,546,222 B2 | 6/2009 | Chintalapti et al. | |
| 7,577,872 B2 | 8/2009 | DiBartolomeo et al. | |
| 7,664,986 B2 | 2/2010 | Angamuthu et al. | |
| 7,668,953 B1 * | 2/2010 | Sinclair et al. | 709/224 |
| 7,681,086 B2 | 3/2010 | Vlassova et al. | |
| 7,802,144 B2 | 9/2010 | Vinberg et al. | |
| 2003/0033559 A1 | 2/2003 | Williams | |
| 2003/0074607 A1 | 4/2003 | Brundridge et al. | |
| 2004/0078683 A1 * | 4/2004 | Buia et al. | 714/37 |
| 2004/0078695 A1 | 4/2004 | Bowers et al. | |
| 2004/0078727 A1 | 4/2004 | Little et al. | |
| 2004/0153429 A1 | 8/2004 | Horn et al. | |
| 2004/0193956 A1 | 9/2004 | Greenlee et al. | |
| 2005/0102567 A1 | 5/2005 | McGuire et al. | |
| 2005/0120273 A1 | 6/2005 | Hudson et al. | |
| 2005/0210331 A1 | 9/2005 | Connelly et al. | |
| 2005/0228880 A1 | 10/2005 | Champlin | |
| 2006/0256727 A1 * | 11/2006 | Acharya et al. | 370/244 |
| 2007/0021966 A1 | 1/2007 | Ellefson et al. | |
| 2007/0283329 A1 | 12/2007 | Caprihan et al. | |
| 2008/0065706 A1 | 3/2008 | Miller et al. | |
| 2008/0109796 A1 | 5/2008 | Kosche | |
| 2008/0125877 A1 | 5/2008 | Miller et al. | |
| 2008/0133978 A1 | 6/2008 | Angamuthu et al. | |
| 2008/0141072 A1 | 6/2008 | Kalgren et al. | |
| 2008/0189488 A1 | 8/2008 | DeWitt et al. | |
| 2008/0208784 A1 | 8/2008 | Hill et al. | |
| 2008/0208787 A1 | 8/2008 | Luchene | |
| 2008/0297375 A1 * | 12/2008 | Khuzadi | 340/945 |
| 2009/0083576 A1 | 3/2009 | Vlassova et al. | |
| 2009/0105982 A1 | 4/2009 | Sarig et al. | |
| 2009/0105989 A1 | 4/2009 | Ramacher et al. | |
| 2009/0105991 A1 | 4/2009 | Ramacher et al. | |
| 2009/0106180 A1 | 4/2009 | Kuchibhotla et al. | |
| 2009/0106262 A1 | 4/2009 | Fallen et al. | |
| 2009/0106363 A1 | 4/2009 | Fallen et al. | |
| 2009/0106589 A1 | 4/2009 | Ramacher et al. | |
| 2009/0106595 A1 | 4/2009 | Sarig et al. | |
| 2009/0106596 A1 | 4/2009 | Fallen et al. | |
| 2009/0106601 A1 | 4/2009 | Ngai et al. | |
| 2009/0106605 A1 | 4/2009 | Kuchibhotla et al. | |
| 2009/0327815 A1 | 12/2009 | Sridharan et al. | |
| 2010/0257410 A1 | 10/2010 | Cottrell et al. | |

OTHER PUBLICATIONS

U.S. Appl. No. 12/485,759, filed Jun. 16, 2009, Beg et al.
U.S. Appl. No. 12/485,763, filed Jun. 16, 2009, Beg et al.
U.S. Appl. No. 12/485,766, filed Jun. 16, 2009, Beg et al.
U.S. Appl. No. 12/641,038, filed Dec. 17, 2009, Beg et al.
Avin, C., et al., "Identifiability of Path-Specific Effects," UCLA Cognitive Systems Laboratory, Technical Report R-321 of Jun. 2005, in Proceedings of the 19th International Joint Conference on Artificial Intelligence, Edinburgh, Scotland, Aug. 2005, 7 pages.
Haicheng, W., et al., "Research on The Function Model of Distributed Intelligent Monitoring and Diagnosis System Based on Multi-Agent," in Electronic Measurement and Instruments, 2007, The Eighth International Conference on Electronic Measurement and Instruments, ICEMI 2007, pp. 3-393-3-396, Copyright 2007 IEEE.
Halpern, J. Y., et al., "Causes and Explanations: A Structural-Model Approach—Part I: Causes," Technical Report R-266-UAI of Jun. 2001, in Proceedings of the Seventeenth Conference on Uncertainty in Artificial Intelligence, San Francisco, CA, 2001, pp. 194-202. [Can also be found in British Journal of Philosophy of Science, vol. 56, 2005, pp. 843-887.].
Halpern, J. Y., et al., "Causes and Explanations: A Structural-Model Approach—Part II: Explanations," Technical Report R-266-IJCAI of Jun. 2001, in Proceedings of the Seventeenth International Joint Conference on Artificial Intelligence (IJCAI), San Francisco, CA, 2001, 8 pages. [Can also be found in British Journal of Philosophy of Science, vol. 56, 2005, pp. 889-911.].
Jongsawat, N., et al., "Dynamic Data Feed to Bayesian Network Model and SMILE Web Application," in Ninth ACIS International Conference on Software Engineering, Artificial Intelligence, Networking, and Parallel/Distributed Computing, pp. 931-936, Copyright 2008 IEEE.
Morjaria, M., et al., "Monitoring Complex Systems with Causal Networks," IEEE Computational Science & Engineering, vol. 3, Issue 4, Winter 1996, pp. 9-10.
Nielsen, U. H., et al., "Explanation Trees for Causal Bayesian Networks," 8 pages. [Can also be found in Proceedings of the 24th Annual Conference on Uncertainty in Artificial Intelligence (UAI-08), 2008, pp. 427-434.].
Pearl, J., "Causal Diagrams for Empirical Research (With Discussions)," Technical Report R-218-B, Biometrika, vol. 82, No. 4, 1995, pp. 669-710, printed in Great Britain.
Pearl, J., "Causal Inference in Statistics: An Overview," Technical Report R-350 of Sep. 2009, Statistics Surveys, vol. 3, 2009, pp. 96-146.
Pearl, J., "Direct and Indirect Effects," Technical Report R-273-UAI of Jun. 2001, In Proceedings of the Seventeenth Conference on Uncertainty in Artificial Intelligence, San Francisco, CA, 2001, pp. 411-420.
Pearl, J., "Robustness of Causal Claims," Technical Report R-320 of Mar. 2004, Submitted to the 20th Conference on Uncertainty in Artificial Intelligence, Banff, Canada, Jul. 2004, 8 pages. [Can also be found in Proceedings of the 20th Conference on Uncertainty in Artificial Intelligence, AUAI Press, Arlington, VA, Jul. 2004, pp. 446-453.].
Pearl, J., "Simpson's Paradox: An Anatomy," Technical Report R-264, Extracted from Chapter 6 of Causality, Apr. 1999, pp. 1-11.
Pearl, J., "Statistics and Causal Inference: A Review," Test Journal, vol. 12, No. 2, Dec. 2003, pp. 281-345.
Pearl, J., "The Logic of Counterfactuals in Causal Inference (Discussion of 'Causal Inference without Counterfactuals' by A.P. Dawid)," Technical Report R-269 of Apr. 2000, in Journal of American Statistical Association, vol. 95, No. 450, Jun. 2000, pp. 428-435.
Tian, J., et al., "A General Identification Condition for Causal Effects," Technical Report R-290-A of Aug. 2002, in Proceedings of the Eighteenth National Conference on Artificial Intelligence, AAAI Press/The MIT Press: Menlo Park, CA, Aug. 2002, pp. 567-573.

Tian, J., et al., "Probabilities of Causation: Bounds and Identification," Technical Report R-271-A of Feb. 2000, in Annals of Mathematics and Artificial Intelligence, vol. 28, 2000, pp. 287-313.

Uraikul, V., "Artificial Intelligence for Monitoring and Supervisory Control of Process Systems," Science Direct, in Engineering Applications of Artificial Intelligence, vol. 20, Issue 2, Mar. 2007, 17 pages (pp. 115-131 in publication), Copyright 2006 Elsevier Ltd.

Yu, J., et al., "Intelligent Monitoring and Diagnosis of Manufacturing Processes Using an Integrated Approach of KBANN and GA," Science Direct, in Computers in Industry, vol. 59, Issue 5, May 2008, 13 pages (pp. 489-501 in publication), Copyright 2007 Elsevier B.V.

Zhang, D., et al., "Researches and Application of a Hybrid Fault Diagnosis Expert System," Proceedings of the 3$^{rd}$ World Congress on Intelligent Control and Automation, Jun. 28-Jul. 2, 2000, Hefei, P.R. China, pages 215-219, Copyright 2000 IEEE.

Non-Final Office Action for U.S. Appl. No. 12/251,700 mailed on Jul. 19, 2010; 16 pages.

Non-Final Office Action for U.S. Appl. No. 12/251,671 mailed on Sep. 17, 2010; 13 pages.

Non-Final Office Action for U.S. Appl. No. 12/485,759 mailed on Dec. 21, 2010; 21 pages.

Non-Final Office Action for U.S. Appl. No. 12/485,766 mailed on Jan. 25, 2011; 21 pages.

Non-Final Office Action for U.S. Appl. No. 12/251,661 mailed on Nov. 10, 2010; 20 pages.

Notice of Allowance for U.S. Appl. No. 12/251,671 mailed on Jan. 5, 2011, 6 pages.

Final Office Action for U.S. Appl. No. 12/251,700 mailed on Dec. 29, 2010; 14 pages.

Non-Final Office Action for U.S. Appl. No. 12/251,711 mailed on Nov. 9, 2010; 18 pages.

Non-Final Office Action for U.S. Appl. No. 12/251,743 mailed on Dec. 14, 2010; 19 pages.

Non-Final Office Action for U.S. Appl. No. 12/252,128 mailed on Dec. 23, 2010; 19 pages.

Non-Final Office Action for U.S. Appl. No. 12/251,731 mailed on Mar. 2, 2011; 36 pages.

Non-Final Office Action for U.S. Appl. No. 12/251,648 mailed on Mar. 1, 2011; 35 pages.

Non-Final Office Action for U.S. Appl. No. 12/251,667 mailed on Mar. 1, 2011; 22 pages.

* cited by examiner

DIAGNOSABILITY SYSTEM

CROSS-REFERENCES TO RELATED APPLICATIONS

This application claims the benefit and priority under 35 U.S.C. 119 (e) of U.S. Provisional Application Ser. No. 60/981,456, filed 19 Oct. 2007, entitled DIAGNOSABILITY FRAMEWORK, the contents of which are herein incorporated by reference in their entirety for all purposes.

This application also incorporates by reference for all purposes the entire contents of the following related and commonly-assigned non-provisional applications, all filed concurrently with the present application:

(1) U.S. application Ser. No. 12/251,648 entitled RULE-BASED ENGINE FOR GATHERING DIAGNOSTIC DATA, filed Oct. 15, 2008, now U.S. Publication No. 2009/0105991, published Apr. 23, 2009;

(2) U.S. application Ser. No. 12/251,711 entitled NON-INTRUSIVE GATHERING OF DIAGNOSTIC DATA USING ASYNCHRONOUS MECHANISMS, filed Oct. 15, 2008, now U.S. Publication No. 2009/0105989, published Apr. 23, 2000;

(3) U.S. application Ser. No. 12/251,731 entitled GATHERING CONTEXT INFORMATION USED FOR ACTIVATION OF CONTEXTUAL DUMPING, filed Oct. 15, 2008, now U.S. Publication No. 2009/0106589, published Apr. 23, 2009;

(4) U.S. application Ser. No. 12/251,743 entitled USER-TRIGGERED DIAGNOSTIC DATA GATHERING, filed Oct. 15, 2008, now U.S. Publication No. 2009/0106596, published Apr. 23, 2009;

(5) U.S. application Ser. No. 12/251,661 entitled DIAGNOSTIC DATA REPOSITORY, filed Oct. 15, 2008 now U.S. Publication No. 2009/0106601, published Apr. 23, 2009;

(6) U.S. application Ser. No. 12/251,667 entitled DIAGNOSABILITY SYSTEM: FLOOD CONTROL, filed Oct. 15, 2008 now U.S. Publication No. 2009/0105982, published Apr. 23, 2009;

(7) U.S. application Ser. No. 12/251,671 entitled GATHERING INFORMATION FOR USE IN DIAGNOSTIC DATA DUMPING UPON FAILURE OCCURRENCE, filed Oct. 15, 2008 now U.S. Publication No. 2009/0106595, published Apr. 23, 2009;

(8) U.S. application Ser. No. 12/251,685 entitled SITE SCRUBBING AND EDITING OF DIAGNOSTIC DATA, filed Oct. 15, 2008 now U.S. Publication No. 2009/0106262, published Apr. 23, 2009;

(9) U.S. application Ser. No. 12/251,700 entitled INTELLIGENT COLLECTION OF DIAGNOSTIC DATA FOR COMMUNICATION TO DIAGNOSIS, filed Oct. 15, 2008 now U.S. Publication No. 2009/0106363, published Apr. 23, 2009;

(10) U.S. application Ser. No. 12/252,070 entitled HEALTH METER, filed Oct. 15, 2008 now U.S. Publication No. 2009/0106180, published Apr. 23, 2009;

(11) U.S. application Ser. No. 12/252,128 entitled HEALTH MONITOR, filed Oct. 15, 2008 now U.S. Publication No. 2009/0106605, published Apr. 23, 2009.

BACKGROUND OF THE INVENTION

The present invention relates to system maintenance and diagnosis, and more particularly to a diagnosability system for collecting, storing, communicating, and analyzing diagnostic information for a monitored system.

When a system encounters a failure or error, diagnostic data is typically collected and stored to a disk for diagnostic analysis (also referred to as dumping diagnostic data to a disk). The diagnostic data may be communicated to a diagnosis site for analysis and resolution of the error. The amount of diagnostic data that is gathered and stored (also referred to as diagnostic data dumps) varies from one system to another. Using one conventional approach, all of the data associated with the system is gathered after every error and stored to the persistent memory (e.g., a disk) for diagnostic purposes. The stored data is then communicated to a diagnosis site for analysis. Such an approach of complete diagnostic data gathering however consumes a lot of time and valuable system resources. Further, the amount of data that is collected may include thousands of files and many gigabytes of data. Sending such a large volume of data to the diagnosis site is cumbersome, time-consuming, and expensive. Further, if the data received at a diagnosis site is very large, it takes the vendor a long time to analyze the received diagnostic data to identify relevant pieces of data for analyzing a particular problem. This increases the amount of time needed to diagnose the error or problem.

In some other systems, only a minimally basic set of diagnostic data associated with the system is collected and stored upon occurrence of an error during an initial diagnostic process. The diagnostic data gathered by the initial diagnostic process is then analyzed, generally manually, to determine what additional diagnostic processes have to be run to capture additional data that is more relevant to the specific failure and essential for error resolution. This iterative process continues until someone manually determines that sufficient data has been gathered to solve the problem. This second approach causes diagnostic data to be gathered over multiple iterations rather than being gathered on the first occurrence of the failure or error. After each iteration, a manual determination has to be made if sufficient diagnostic data has been gathered. This process is very time-consuming and also very error-prone due to its manual component. In addition, this process is not an efficient way to gather the required diagnostic data on the first occurrence of a failure. As a result, the time needed to resolve the error is again increased, leading to customer dissatisfaction.

As indicated above, several prior solutions for gathering diagnostic data rely on a human to gather the relevant diagnostic data for a failure, analyze the gathered diagnostic data, and determine if any additional data needs to be collected. For example, a system administrator of a software system may track the failures in the system and determine the diagnostic data to be gathered and sent to the software vendor for diagnostic analysis. Typically, the administrator has to manually decide and generate the diagnostic data that is needed for proper diagnosis of the failure. Gathering a sufficient amount of diagnostic data that is relevant for resolving a particular error usually takes several iterations including many round trips between the administrator and the software support/development organization. This results in a long resolution time for the failure or error. Further, because of the manual component and because system administrators can have different skill levels, the reliability of the data gathering process is not assured and not repeatable.

BRIEF SUMMARY OF THE INVENTION

Embodiments of the present invention provide a diagnosability system for automatically collecting, storing, communicating, and analyzing diagnostic data for one or more monitored systems. The diagnosability system comprises several components configured for the collection, storage, communication, and analysis of diagnostic data for a condition detected in monitored system. The diagnosability system enables targeted dumping of diagnostic data so that only diagnostic data that is relevant for diagnosing the condition detected in the monitored system is collected and stored. This in turn enables first failure analysis thereby reducing the time needed to resolve the condition detected in the monitored system.

For example, in one embodiment, a rule-based engine is provided that is configured to automatically determine one or more actions to be performed responsive to a condition detected in the monitored system. The actions may include performing tasks that gather only diagnostic data that is relevant to the particular detected condition. The actions may also include performing one or more health checks to periodically gather health information for minimizing the occurrences of errors or for catching errors at an early stage. A hierarchical file-based diagnostic data repository may be provided for storing the diagnostic data collected for the monitored system. A packaging component may also be provided that is configured to intelligently determine diagnostic data to be sent to a diagnosis site (e.g., a vendor site) for analysis, prepares a package based upon the determined data, and communicates the package from a product or system site (e.g., a customer site) to the diagnosis site.

The diagnosability system according to an embodiment of the present invention may be used with various different systems including but not restricted to software systems including complex enterprise software systems, hardware systems, and others.

According to an embodiment of the present invention, techniques are provided for determining a diagnostic action to be performed in a monitored system. A condition may be detected in the monitored system. Context data may be determined for the detected condition. A diagnostic action to be performed responsive to the detected condition may be determined based upon the context data determined for the detected condition and a set of one or more rules configured for the monitored system. The diagnostic action is executed that gathers diagnostic data relevant to the condition. The diagnostic data is stored in a diagnostic data repository. A portion of the diagnostic data is determined to be sent to a diagnosis site. A package comprising the portion of the diagnostic data determined is prepared and communicated to the diagnosis site.

In one embodiment, determining the context data may comprise determining information related to the detected condition in the monitored system; determining information related to functions and/or processes that are being executed in the monitored system; determining information related to a tagged function or process; and determining information related to an impact that the detected condition has on the monitored system.

In one embodiment, determining the diagnostic action to be performed comprises determining a set of one or more rules configured for the monitored system and determining that the condition associated with a first rule from the set of rules is satisfied by the context data determined, wherein at least one action specified by the first rule is the diagnostic action determined to be performed in the monitored system. Each rule configured for the monitored system may specify a condition and one or more actions to be performed when the condition specified in the rule is satisfied.

In one embodiment, information recommending execution of the diagnostic action is output. The diagnostic action is executed only upon receiving an input from a user to execute the diagnostic-related action, wherein the diagnostic action is executed using the context data determined for the detected condition.

In one embodiment, information related to the monitored system may be gathered and stored during runtime of the monitored system. A portion of the stored information may be retrieved in response to the condition detected in the monitored system. The retrieved information may be used for determining the diagnostic actions to be performed in response to the detected condition.

In one embodiment, a first rule may be determined for the condition detected in the monitored system. The first rule may specify when diagnostic data gathering is to be suppressed or allowed upon occurrence of the detected condition. Based upon the first rule, it may be determined if gathering of diagnostic data for the condition is to be suppressed. Gathering of diagnostic data for the detected condition may be suppressed upon determining that gathering of diagnostic data for the detected condition is to be suppressed.

In one embodiment, a second rule may be determined for the diagnostic action to be performed in response to the condition detected in the monitored system. The second rule may specify when execution of the diagnostic action is to be suppressed or allowed. Based upon the second rule, it may be determined if execution of the diagnostic action is to be suppressed. Gathering of diagnostic data for the detected condition may be suppressed upon determining that the execution of the diagnostic action is to be suppressed.

In one embodiment, an indication of the condition detected in the monitored system may be received from a first process or thread in the monitored system. A second process or thread may be initiated. The determined diagnostic action is executed in the second process or thread. The first process or thread may continue processing without being delayed or interrupted by the execution of the diagnostic action in the second process or thread.

In one embodiment, a health check to determine information related to the monitored system may be executed. The health check may be invoked based upon a predefined schedule or in response to the condition detected in the monitored system. Information related to the monitored system determined from executing the health check may be output or displayed.

In one embodiment, diagnostic data related to a first monitored system may be stored in a first directory in the diagnostic data repository. Diagnostic data related to a second monitored system may be stored in a second directory in the diagnostic data repository. The first directory and the second directory may be stored under a common directory in the diagnostic data repository.

In one embodiment, storing the diagnostic data comprises storing metadata information, wherein the metadata information includes one or more correlation keys; storing information related to one or more health checks for the monitored system; storing information related to packaged diagnostics that is to be communicated to the diagnosis site; and storing information related to one or more incidents for the monitored system.

In one embodiment, a request is received to create a package to be communicated to the diagnosis site. A first set of one or more incidents based upon the request is determined, wherein each incident corresponds to an error detected in the monitored system. A second set of incidents correlated to the first set of incidents is also determined. Diagnostic data for the first set of incidents and the second set of incidents is determined. A package comprising the diagnostic data determined for the first set of incidents and the second set of incidents is prepared. The portion of the diagnostic data included in the package may be modified prior to communication of the package to the diagnosis site.

In one embodiment, an incident and an associated problem key may be generated in response to the condition detected in the monitored system.

The foregoing, together with other features and embodiments will become more apparent when referring to the following specification, claims, and accompanying drawings.

DETAILED DESCRIPTION OF THE INVENTION

In the following description, for the purposes of explanation, specific details are set forth in order to provide a thorough understanding of the invention. However, it will be apparent that the invention may be practiced without these specific details.

Embodiments of the present invention provide a diagnosability system for automatically collecting, storing, communicating, and analyzing diagnostic data for one or more monitored systems. The diagnosability system comprises several components configured for the collection, storage, communication, and analysis of diagnostic data for a condition detected in monitored system. The diagnosability system enables targeted dumping of diagnostic data so that only diagnostic data that is relevant for diagnosing the condition detected in the monitored system is collected and stored. This in turn enables first failure analysis thereby reducing the time needed to resolve the condition detected in the monitored system.

In one embodiment, a rule-based engine is provided that is configured to automatically determine one or more diagnostic actions to be performed responsive to a condition detected in the monitored system. The actions may include performing tasks that gather diagnostic data that is relevant to the detected condition, executing one or more health checks to gather information related to the monitored system for minimizing the occurrences of errors or for catching errors at an early stage and other diagnostic related actions. In this manner, the human component of manually iteratively determining the diagnostic data to be gathered is eliminated. This in turn enables first failure analysis and avoids round trips to the customer thereby reducing the time needed to resolve the condition detected in the monitored system. A hierarchical file-based diagnostic data repository is provided for depositing various different diagnostic data collected for the monitored system including metadata information that enables searching and correlations among the stored data. A packaging component is provided that intelligently identifies an appropriate set of diagnostic data to be communicated from a product or system site (e.g., a customer site) to a diagnosis site (e.g., a vendor site), prepares a package based upon the determined data, and communicates the package from a product or system site (e.g., a customer site) to the diagnosis site. Techniques are also provided that enable a customer to review the data identified for transmission to the diagnosis site prior to the transmission.

Figure 1:
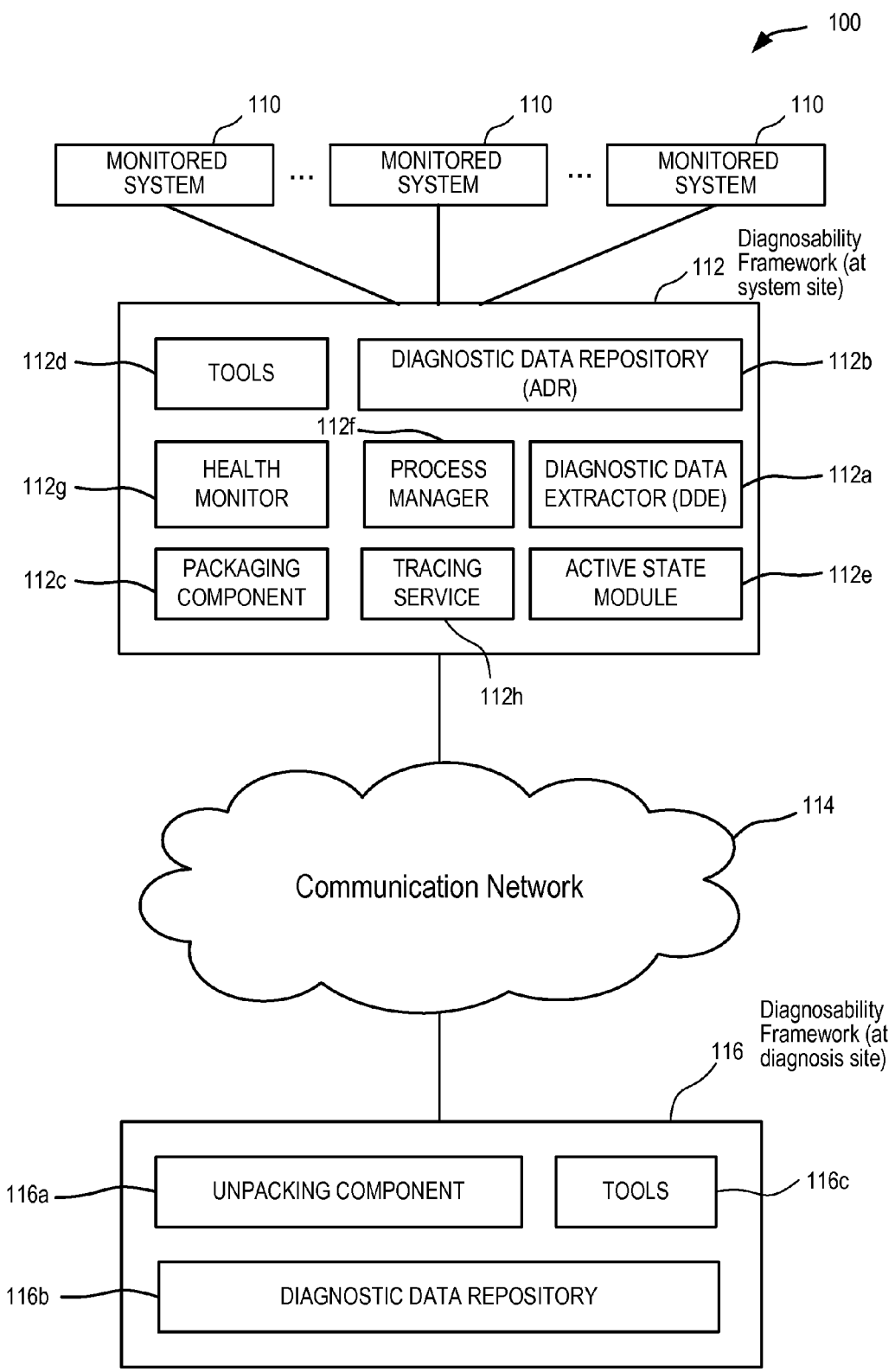
FIG. 1 is a simplified block diagram illustrating a diagnosability system according to an embodiment of the invention.

FIG. 1 is a simplified block diagram of a diagnosability system 100 according to an embodiment of the present invention. Diagnosability system 100 facilitates collection, storage, communication, and analysis of diagnostic data related to one or more monitored systems 110 (which may be different products or different instances of the same product). Monitored system 110 may be a software system, a hardware system, an enterprise system, and like. For example, monitored system 110 may be a complex enterprise software system such as a database system and related products provided by Oracle Corporation™ of California.

As depicted in FIG. 1, diagnosability system 100 comprises a diagnosability framework 112 deployed at a system site to provide diagnostic support for monitored system 110. Diagnosability system 100 also comprises a diagnosability framework 116 deployed at a diagnosis site. A diagnosis site may be for example a site of a vendor that is responsible for diagnosing problems that may occur in monitored system 110.

In a typical diagnostic workflow, diagnostic data is captured and stored for monitored system 110 by diagnosability framework 112. For example, diagnosability framework 112 may be configured to gather and store data related to monitored system 110 when an error or other interesting condition is detected in monitored system 110. The diagnostic data collected and stored by diagnosability framework 112 (also referred to as diagnostic data dumps) may include, for example, trace data, diagnostic dumps, run reports, logs (e.g., error logs), results of diagnosability related actions such as health checks, and the like. Portions of the diagnostic data stored by diagnosability framework 112 may be communicated to diagnosability framework 116 located at the diagnosis site for analysis such as failure analysis. The diagnostic data may be communicated from diagnosability framework 112 to diagnosability framework 116 via a communication network 114. Communication network 114 may be any network capable of communicating data such as the Internet, an intranet, a switched network, and the like. Communication network 114 may include wired or wireless communication links. Various communication protocols may be used to communicate data from diagnosability framework 112 to diagnosability framework 116.

As depicted in FIG. 1, diagnosability framework 112 comprises several components including a diagnostic data extractor (DDE) 112a, a diagnostic data repository (DDR) 112b, a packaging component 112c, various tools 112d, an active state module 112e, an asynchronous process manager 112f, a health monitor module 112g, and a tracing service component 112h. The various components depicted in FIG. 1 are merely examples of components that may be included in diagnosability framework 112. In alternate embodiments, diagnosability framework 112 may have less or more components or modules than those shown. The components or modules in diagnosability framework 112 may be implemented in software (e.g., code, program, instructions that are stored on a machine-readable medium and executed by a processor), hardware, or combinations thereof.

In one embodiment, active state module 112e is configured to gather and store information related to monitored system 110 during run time of the monitored system. Upon occurrence or detection of a condition in monitored system 110, a portion of the information that is gathered and stored by active state module 112e during run time is then available and provided as useful contextual data for facilitating the gathering of diagnostic data that is relevant to the detected condition in the monitored system. For example, the information that is gathered and stored by active state module 112e may be provided to DDE 112a for determining one or more diagnostic actions to be performed upon occurrence or detection of the condition in system 110 (e.g., actions for gathering diagnostic data relevant to the condition detected in the monitored system). In one embodiment, the information gathered and stored by active state module 112e during run time may be dumped to persistent memory (e.g., disk) upon occurrence or detection of a condition in monitored system 110.

Various different types of information related to monitored system 110 may be gathered and stored by active state module 112e during run time of monitored system 110. In one embodiment, active state module 112e may gather and store information related to one or more local variables that are used in one or more functions in the call stack (a call stack stores information about processes and functions that are currently being executed by monitored system 110). For example, active state module 112e may gather and store pointers to the local variables that are used in a function during run time of the monitored system. If the pointers to the local variables are still pointing to something valid (i.e., local variables are still active) upon occurrence or detection of a condition in system 110, then the information related to the local variables (pointers to the variables and other information related to the variables) may be dumped to persistent memory or output to other components of diagnosability framework 112 for use in diagnostic data dumping.

In one embodiment, active state module 112e may gather and store information related to information that is explicitly tagged as relevant to diagnosis. The tagged information may be a specific section of system code or a specific function or process executing in the monitored system. The information related to the tagged information may include a name for the tag, a tag identifier of the tag, a tag state (e.g., "active" or "inactive"), and other information related to the tagged information. In one embodiment, a user such as a developer may explicitly tag a specific section of a function or a specific operation in monitored system 110 as relevant for diagnostics during design time. During run time of system 110, the tag state for a tag may be changed from "inactive" to "active" depending on whether the tagged information is active on the call stack or not. For example, if a specific function is tagged, and if the tagged function is currently active on the call stack, then the tag state associated with the tag is set to "active" and the tag is deemed to be an active tag. On the other hand, if the specific function is not active on the call stack, then the tag state associated with the tag is "inactive" and the tag is deemed to be an inactive tag.

In one embodiment, information related to the tagged information that is tagged by an active tag is provided as useful contextual data for diagnostic data dumping in monitored system 110 upon occurrence or detection of a condition in the monitored system. In this manner, tagging provides a window into what was occurring in the monitored system at and around the time of the error. Tagging also enables a user to specify what specific contextual data may be gathered by active state module 112e and used for diagnostic data dumping upon occurrence or detection of a condition in system 110.

DDE 112a is configured to detect occurrences of conditions in system 110 and determine one or more diagnostic actions to be performed in response to the detected conditions. In one embodiment, in response to a condition detected in monitored system 110, DDE 112a is configured to determine one or more actions to be performed based upon context data determined for the detected condition. The context data determined for a condition may comprise various different pieces of data including:

Information related to the detected condition, such as error number and error arguments, and the like;

Information related to functions and/or processes that are being executed in the monitored system;

Information related to components of monitored system 110 that are active on the call stack;

Information related to one or more functions and components that signaled the detected condition;

Information related to probable impacts that the detected conditions may have on monitored system 110;

Information that is captured and provided by active state module 112e, such as the information related to a tagged function or process, and the like.

In one embodiment, DDE 112a is a rule-based engine that is configured with a set of one or more DDE rules. A DDE rule may identify a DDE condition and one or more diagnostic actions (also referred to as DDE actions) to be performed when the DDE condition specified in the DDE rule is met. A DDE condition specified in a DDE rule may comprise information related to one or more conditions that may be detected in monitored system 110, information related to functions and components on the call stack, and other information. The diagnostic actions specified in a DDE rule may include actions that upon execution gather diagnostic data that is relevant to the condition detected in monitored system 110, actions that invoke health checks to gather health information about monitored system 110, and other diagnostic actions. DDE rules may be user-configurable.

In one embodiment, only diagnostic data that is deemed to be relevant to a condition detected in system 110 is gathered. The context data determined for the condition detected in monitored system 110 coupled with the rules-based engine provided by DDE 112a enables diagnosability framework 112 to intelligently gather diagnostic data that is relevant and useful for resolution of the condition that triggered the diagnostic data gathering. The DDE rules enable automatic determination of the relevant diagnostic data to be gathered for a condition detected in monitored system 110 without requiring any human intervention. The DDE rules may be configured such that the right level of detail is collected and stored for the detected condition. This facilitates targeted dumping and storage of diagnostic data that is relevant to the specific condition detected in the monitored system. This in turn enables first failure analysis such that the required diagnostic dumps for the condition detected in the monitored system may be obtained on the first occurrence of the detected condition.

A diagnostic action determined by DDE 112a may be executed in an asynchronous manner or a synchronous manner. A diagnostic action is performed in a synchronous manner if the diagnostic action is performed by the failing process or thread. For example, a failing processor or thread may execute one or more diagnostic actions to collect diagnostic data critical for diagnosis of the condition that caused the process or thread to fail. In one embodiment, the failing process or thread may be the process or thread that receives the condition that triggered the diagnostic action.

A diagnostic action is performed in an asynchronous manner if the diagnostic action is performed by a process or thread other than the failing process or thread such that the failing process or thread can continue processing without having to wait for the completion of the executed diagnostic actions. An example of such an action is an action that involves diagnostic dumping of the Redo Logs in a database system. This action typically requires a long time to finish execution and is accordingly executed asynchronously in a process or thread that is different from the failing process, allowing the failing process or thread to continue processing without having to wait for the completion of the diagnostic action.

In one embodiment, process manager 112f is configured to receive a request from DDE 112a that determines one or more diagnostic actions to be performed in an asynchronous manner. Process manager 112f may spawn one or more asynchronous processes or threads to perform the diagnostic actions in an asynchronous manner. Process manager 112f may also receive requests from other components of diagnosability framework 112 to perform one or more diagnostic actions asynchronously in a different process or thread. In this manner, process manager 112f acts as a common coordinator for receiving requests to perform diagnostic actions asynchronously in different processes or threads. The diagnostic data resulting from executing a diagnostic action asynchronously or synchronously may be stored on disk, private memory, shared memory, etc. In one embodiment, the diagnostic data is stored in diagnostic data repository 112b.

In one embodiment, health monitor module 112g is configured to perform one or more health checks for diagnosing and/or gathering information related to system 110. A health check may be invoked proactively on a scheduled basis, reactively by DDE 112a in response to a condition detected in monitored system 110, or may also be invoked manually by a user such as a system administrator for monitored system 110. A health check is a function or task that is executed to determine information related to monitored system 110. For example, a health check may be configured to gather information related to various aspects of monitored system 110 including information related to one or more layers or components in monitored system 110. In one embodiment, a health check is a piece of code that is executed by a processor and the execution of which results in information related to monitored system 110 being determined and/or gathered for diagnostic purposes.

The information gathered by the execution of a health check may be used for various different purposes. For example, the information determined and/or gathered by a proactive health check may be used for early detection of conditions and the prevention of error conditions. This may limit or prevent the potential damages caused by these conditions.

The information gathered by the execution of a reactive health check in response to a condition in system 110 may also be used for assessing the extent of damage caused by the condition, facilitating diagnostic analysis of the condition, limiting the amount of damages caused by the condition, and the like. For example, consider the situation in which data corruption is detected in system 110. The data corruption may cause a reactive health check to be executed that determines information related to the data corruption. The determined data may be used to assess the damage, if any, caused by the data corruption. A reactive health check may also be used to influence the scheduling behavior of a proactive check. For example, if one or more error conditions related to a component or layer in monitored system 110 are detected as a result of the execution of the reactive health check, it may be a good idea to increase the frequency of the proactive health check related to that particular component/layer in the hope of reducing occurrence of future conditions of the same or similar kind. The output of a health check may also be used to determine and provide recommendation for repairing a condition. For example, data captured by a reactive health check executed in a response to a data corruption condition in system 110 may be used to provide recommendations to limit the amount of damages caused by the data corruption.

In one embodiment, a tracing services component 112h (also sometimes referred to as unified tracing service (UTS) in the applications incorporated by reference in the present application) is provided that is configured to perform in-memory and disk-based tracing. Tracing component 112h logs activities related to system 110 such as state transitions, transaction states, etc. In one embodiment, during normal operation of the system, trace information is written to a circular buffer in memory. When a condition is detected in system 110, the contents of the buffers are dumped to disk. In this manner, tracing services component 112h uses a combination of in-memory and disk-based tracing. The size of the in-memory buffers used for storing tracing information is user-configurable.

In one embodiment, the instrumentation or hooks that enable tracing may be spread across monitored system 110 and can be turned on or off as needed with little or no impact to monitored system 110. The hooks enable the desired granularity of diagnostic data to be captured to facilitate first failure analysis. This in turn reduces the need for debug patches to be sent to the customer or system site from the diagnosis site that are aimed for capturing more data for diagnosis of a particular problem.

Diagnostic data repository 112b (also sometimes referred to as ADR in the applications incorporated by reference in the present application) provides a centralized repository for storing diagnostic data related to monitored system 110 collected by diagnosability framework 112. The diagnostic data collected by diagnosability framework 112 may be stored in a structured format that enables searching and database-like querying capabilities. In one embodiment, ADR module 112b is a file-based repository. Various different types of diagnostic data may be stored in ADR module 112b such as traces, dumps, alert logs, health monitor reports, and the like. Information gathered by active state module 112e (e.g., such as information related to one or more local variables for a particular function on the call stack) may be stored or dumped into ADR module 112b.

In one embodiment, ADR module 112b is capable of storing diagnostic data for multiple monitored systems such as multiple monitored systems 110. The diagnostic data collected for each monitored system 110 may be stored under a separate directory (e.g., an ADR_HOME directory) allocated to that system. The ADR_HOME directories share a common structure to facilitate analysis of the stored data across multiple monitored systems 110. Multiple ADR_HOME directories may be present under a single ADR_BASE directory. In this manner, diagnostic data for multiple monitored systems 110 may be stored and organized in a consistent manner.

In one embodiment, the diagnostic data stored in ADR module 112b may be tagged or annotated with metadata information. The metadata information may be used to find correlations between pieces of the diagnostic data stored in ADR module 112b. The metadata also enables navigation of the diagnostic data stored in ADR module 112b. The metadata may include one or more correlation keys. Further information related to ADR module 112b and correlation keys may be found in the applications incorporated by reference in the present application.

Packaging component 112c facilitates communication of diagnostic data from diagnosability framework 112 to diagnosability framework 116 at the diagnosis site (e.g., a vendor site). In one embodiment, packaging component 112c is configured to identify diagnostic data that is to be transmitted from diagnosability framework 112 at the system site to diagnosability framework 116 at the diagnosis site, prepare a package including the identified diagnostic data, and transmit the package to the diagnosis site.

Packaging component 112c also provides services that enable a user of diagnosability framework 112 to modify the contents of a package prior to transmission of the package from diagnosability framework 112 to diagnosability framework 116. The modification may include modification or removal of data identified to be included in the package and/or addition of additional data to the package. For example, sensitive data or other data that a customer of the monitored system does not want to transmit to the diagnosis site may be removed from the package prior to transmission of the package. In one embodiment, packaging component 112c may provide an interface that enables a user at the monitored system site to review and make modifications, including additions and deletions, to the diagnostic data included in a package to be transmitted to the diagnosis site. In this manner, packaging component 112c enables a user of diagnosability framework 112 at the system site to control the data that is to be communicated to the diagnosis site from the system site.

Various tools 112d may be provided as part of diagnosability framework 112. These tools may include tools for querying the diagnostic data or information stored in diagnostic data repository 112b, tools for generating reports, analysis tools, tools for determining and displaying a health meter for monitored system 110 that indicates the status or health of system 110, and other tools that may use information collected and stored by diagnosability framework 112.

In one embodiment, tools 112d may include a health meter module that is configured to perform processing for determining and displaying a health meter that indicates the status or health of monitored system 110 in a simple and easy to understand manner. The status or health of monitored system 110 as indicated by the health meter may be based upon one or more characteristics or perspectives of the system, such as performance, resource utilization, reliability, availability, scalability etc. Each of these perspectives may be treated as components that impact or influence the health meter for monitored system 110. A perspective component may in turn depend upon one or more sub-components. In one embodiment, the one or more sub-components that a perspective component depends upon may be one or more issues influencing the status or health of the perspective component. In addition to the health meter for monitored system 110, a perspective component influencing the system health meter may also have its own health meter representing the health or status of the individual perspective component.

As mentioned previously, diagnosability framework 116 deployed at a diagnosis site is configured to receive data from one or more diagnosability frameworks 112 deployed at system sites. As depicted in FIG. 1, diagnosability framework 116 comprises an unpacking component 116a, a diagnostic data repository 116b, and one or more tools 116c.

Diagnostic data may be communicated from diagnosability framework 112 to diagnosability framework 116 in the form of a package (e.g., a zip file, a tar file). Unpacking component 116a is configured to receive the package transmitted from diagnosability framework 112, unpack the diagnostic data in the package, and make the unpacked data available for analysis at the diagnosis site. In one embodiment, the data is unpacked into a format that can be consumed by users at the diagnosis site. For example, if the diagnosis site is Oracle, the data may be unpackaged into a form that can be consumed by developers and Oracle support personnel who are responsible for providing support for the monitored system. In one embodiment, unpacking component 116a is configured to automatically route the unpackaged data to one or more recipients responsible for analyzing the data.

In one embodiment, the diagnostic data is unpackaged into diagnostic data repository 116b. Diagnostic data repository 116b thus provides a repository for storing data received from one or more monitored system sites. In one embodiment, the structure of diagnostic data repository 116b is the same as the structures of diagnostic data repositories at system sites. This facilitates efficient storage and analysis of the data. In such an embodiment, data from a received package is unpacked and stored in the same directory location(s) in diagnostic data repository 116b as the data was stored in diagnostic data repository 112b of a diagnosability framework deployed at a monitored system from where the data was received.

The monitored system site platform where the diagnostic data is packaged may be different from the platform at diagnosis site. For example, monitored system site may use a Microsoft NT platform while the diagnosis site may use a Linux platform. Further, different monitored system sites may have different platforms such as Microsoft NT, SUN Unix, Linux 64-bit, HP, etc. The packing and unpacking operations enable transfer of diagnostic data from multiple platforms or ports into a common platform at the diagnosis site. In one embodiment, the 32-bit Linux platform is used at the diagnosis site.

Various tools 116c may be provided in diagnosability framework 116 to help analyze the diagnostic data received from diagnosability framework 112 and to guide management and resolution of problems and errors in the monitored systems. These tools may include command line or GUI-based tools for use by personnel at the diagnosis site. For example, the tools may include a tool that may be used to analyze the diagnostic data received from the software system site and to identify causes for the errors, tools for automatically routing the diagnostic data to a correct entity (e.g., a particular group or department responsible for the software that experienced the error, one or more software developers responsible for solving the error, a system administrator, etc.) for diagnosis, and the like.

The various components depicted in the diagnosability framework 116 are merely examples of components that may be included in the diagnosability framework. In alternate embodiments, diagnosability framework 116 may have less or more components than those shown in FIG. 1. The components depicted in diagnosability framework 116 may be implemented in software, hardware, or combinations thereof.

Figure 2:
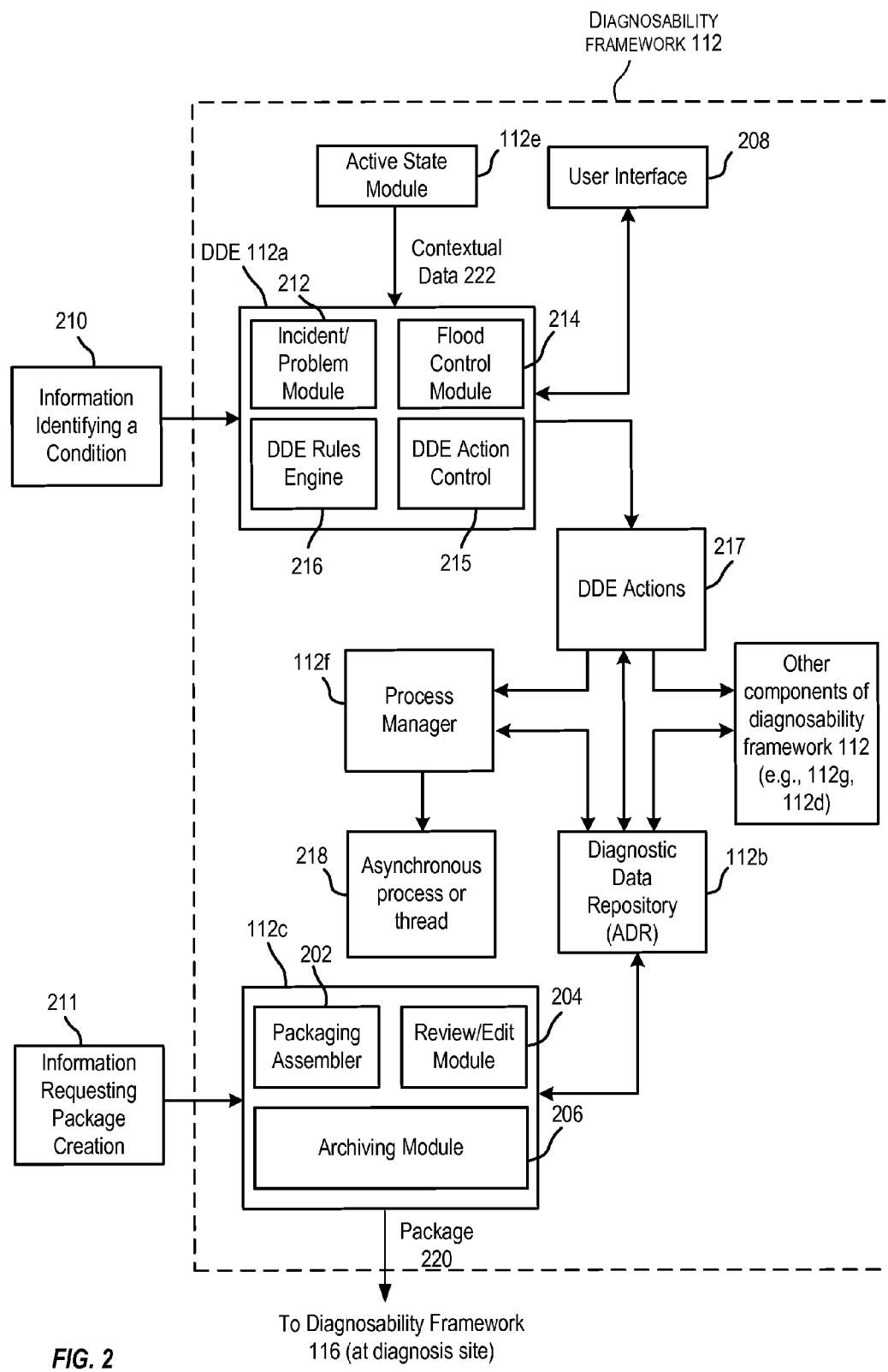
FIG. 2 is a simplified block diagram depicting a diagnosability framework 112 deployed at a monitored system site and also depicting a data flow for the diagnosability framework according to an embodiment of the invention.

FIG. 2 is a simplified diagram showing details related to some components depicted in FIG. 1 and also depicting a data flow for a diagnosability framework 112 deployed at a monitored system site according to an embodiment of the invention. The data flow depicted in FIG. 2 is merely an example of a possible data flow in a diagnosability framework deployed at a monitored system. Other data flows are also possible in alternative embodiments. Accordingly, FIG. 2 and its corresponding description is not intended to limit the scope of the present invention as recited in the claims.

As depicted in FIG. 2, DDE 112a receives information 210 identifying one or more conditions detected in monitored system 110. In one embodiment, DDE 112a may be configured to detect the one or more condition in monitored system 110. In another embodiment, the one or more conditions detected in monitored system 110 may be detected by other components of diagnosability framework 112 or by components that are not part of diagnosability framework 112. The one or more conditions detected in monitored system 110 may include one or more errors detected in monitored system 110. In one embodiment, errors may be classified as critical errors. An error may be considered a critical error if the error is caused due to the working of monitored system 110 itself as opposed to an error caused by a client or user's improper use of system 110. For example, a critical error may be an internal error, a system access violation, or some external error (e.g., an object being accessed no longer exists). Another type of error conditions detected in system 110 may be classified as soft asserts. An error may be considered a soft assert if the error does not cause immediate harm to the monitored system. For example, leaving a file open rather than closing it when the process finishes execution may be viewed as a soft assert.

As mentioned previously, various context data may be determined for a condition detected in monitored system 110 and may include an error number and one or more error arguments associated with the detected condition. For example, in an Oracle database system, error number ORA-60x identifies internal errors that occur in the monitored database system, error number ORA-4020 identifies an external error that occurs in the database system such as a deadlock detected while trying to lock a library object, and so on.

A single error number may be associated with multiple detected conditions in the monitored system 110. Since many conditions detected in the monitored system may be classified under the same error number, one or more error arguments may be used to further qualify or identify the conditions. For example, an error argument associated with a condition identified by an error number may indicate a specific code location that threw an exception that caused the condition. In this manner, error arguments provide additional information about the condition detected in monitored system 110.

The context data determined for a condition detected in monitored system 110 may also include an error level associated with the detected condition. In one embodiment, the following error levels may be defined and associated with a condition:
Level 0—This error level is associated with conditions related to error handling code and DDE module 112a;
Level 1—This error level is associated with all internal errors and OS exceptions detected in the monitored system;
Level 2—This error level is associated with external errors that are handled by DDE 112a.
Level 3—This error level is associated with external errors that are not handled by DDE 112a. The rule-based processing performed by DDE 112a may not be invoked for these errors.

The context data determined for a condition detected in monitored system 110 may further include impact information specifying the potential impact(s) that the detected condition may have on the monitored system. In one embodiment, the impact information associated with a detected condition describes the potential consequences of the condition in terminology that is understandable by users such as system administrators who can use the information to take remedial actions to repair or mitigate the impacts.

For example, the impact information for a memory corruption error related to the dictionary heap may indicate that the dictionary is corrupted. As another example, the impact information related to a memory corruption error related to a heap that belongs to row cache may indicate that the row cache has been corrupted. Accordingly, the same condition (i.e., memory corruption) detected in the monitored system may have different associated impacts depending upon the context of the detected condition. The impact information thus provides specific contextual information related to the impact of a detected condition on monitored system 110, such as which particular memory was corrupted rather than some generic impact information like "memory corruption".

In one embodiment, the impact information may be specified in an external file that maps the impact information to an error number and/or error arguments that are associated with the condition. In this embodiment, given an error number and/or error arguments that are associated with the detected condition, DDE 112a may use the external file to map the error number and/or error arguments to the associated impact information.

The context data determined for a condition detected in monitored system 110 may also include contextual data 222 provided by active state module 112e. For example, active state module 112e may gather and store information related to a tagged function or process during run time of monitored system 110 and provide the information related to the tagged function or process to DDE 112e upon occurrence or detection of a condition in the monitored system. For example, information related to a tagged operation such as a "Parsing_SQL" operation may be gathered and stored by active state module 112e when the tagged operation is executed. If the tagged "Parsing_SQL" operation fails, then the information related to the tagged operation that was gathered and stored by active state module 112e may be provided to DDE 112a as useful contextual data to be used for determining one or more diagnostic action to be performed responsive to the failure. In this manner, the tagged information provided by active state module 112e provides useful contextual data other than just a component or a function name that tends to be too coarse grained for diagnostic purposes.

The context data determined for a condition detected in monitored system 110 may also include information related to functions and/or processes that are being executed in the monitored system. The context data may further include information related to components of monitored system 110. The component information may include information related to components that are active on the call stack, information related to the component that signaled the condition detected in the monitored system, information related to the component that has been identified as most likely having caused the condition detected in the monitored system, and the like.

The component information may be determined by mapping one or more functions on the call stack to the various component information that is associated with the functions upon occurrence or detection of a condition in monitored system 110. The component information may also be determined by DDE 112a or other components of diagnosability framework 112.

In one embodiment, as shown in FIG. 2, DDE 112a comprises an incident/problem module 212 that is configured to create an incident in response to a condition detected in monitored system 110. In one embodiment, an incident represents a single occurrence of a condition in monitored system 110. In one embodiment, incident module 212 is configured to create an incident only for a critical error in monitored system 110.

Various different types of data may be associated with and stored for an incident that is created by incident module 212 including: (1) a system-assigned unique incident identification (ID); (2) a problem key (e.g., a text string) that characterizes the incident; (3) one or more incident attributes that describe the state of the incident such as the time of occurrence of the incident, incident status such as open or closed, severity of the incident, and other attributes that describe the incident; (4) one or more correlation keys (e.g., key and value pairs such as execution context ID, process ID, session ID, time of occurrence, etc.) that can be used for correlations across multiple incidents and multiple monitored systems (e.g., multiple instances of the same product, or different products) that are monitored by diagnosability frameworks such as diagnosability framework 112. Information that is used for making correlations, for example for incidents, may include information related to processes from which the incidents arise, incidents occurring close in time to each other, etc.; (5) metadata that describes the incident; (6) one or more incident dumps collected and stored for the incident.

In one embodiment, incidents having the same associated problem keys are mapped to a problem. A problem may be considered as a set of incidents that are perceived to have the same symptoms. In this manner, incidents that have the same associated problem keys can be grouped under a single problem representing a specific symptom based on their associated problem keys. Various different types of data may be associated with and stored for a problem including: (1) a system-defined unique identification (problem ID); (2) a problem key that characterizes the faulty behavior or symptom (the same problem key is also associated with the incidents that are mapped to the problem); (3) information that describes the first occurrence of an incident categorized under the problem; (4) information that describes the most recent occurrence of an incident categorized under the problem; (5) impact of the problem on the monitored system; (6) metadata that describes the problem.

The organization of diagnostic data collected by diagnosability framework 112 into units such as incidents and problems helps to reduce the amount of diagnostic data that is collected responsive to conditions detected in a monitored system. For example, for incidents that map to the same problem, instead of collecting diagnostic data for all the incidents, diagnostic data may be collected and stored only for a subset of the incidents, thereby reducing the total diagnostic data collected and stored.

Such an organization of diagnostic data also enables customers of software systems to easily locate and package diagnostic information that is relevant for diagnosing a particular problem and communicate the relevant diagnostic information to the diagnosis site for further diagnosis. For example, packaging component 112c is able to identify correlated incidents corresponding to a problem based on some correlation keys (e.g., process ID, time of occurrence, session ID, etc.). Diagnostic data for the correlated incidents may then be packaged and communicated to the diagnosis site. The correlation also ensures that relevant diagnostic data needed for solving the problem is automatically generated at the system site at the time of the first failure such that the relevant diagnostic data can be packaged and communicated to the diagnosis site upon receiving a request for initiating the package assembly and transmission. This reduces or even eliminates the back-and-forth diagnostic data gathering and communication trips that are characteristics of conventional diagnostics systems. This also eliminates the need for a "manual" analysis to determine which further diagnostics are needed (the further diagnostics are automatically determined and executed on the first occurrence of the failure).

As mentioned previously, DDE 112a is a rule-based engine for determining one or more actions to be performed in response to conditions detected in monitored system 110. In one embodiment, as shown in FIG. 2, DDE 112a comprises a DDE rules engine 216 that is configured to determine one or more DDE actions to be performed based upon the context data determined for a condition detected in monitored system 110. In one embodiment, a set of rules may be specified for DDE rules engine 216 with each rule identifying a DDE condition and one or more actions to be performed when the DDE condition specified in the rule is met. DDE rules may be configured or changed via a user interface 208 to suit the needs of monitored system 110.

In one embodiment, a DDE condition may comprise one or more expressions connected by one or more logic operators. An expression in a DDE condition may be associated with one or more arguments. For example, the following expressions and operators may be defined for a DDE condition:

1. Expressions related to an error, such as Error_Number (<error_number>), Error_Arg1(<$1^{st}$ argument>), Is_Internal_Error(<error_number>), Is_External_Error(<error_number>).
2. Expressions related to system components or function names, such as Active_Component(<component>), Signaling_Component(<component>), Function_Name (<function_name>).
3. Expressions related to impacts that an error or other condition detected in a system may have on the monitored system, such as Impact(<impact_name). For example, a condition may be defined as Impact(Disk-Corruption).
4. Expressions related to a diagnostic tag that tags a specific operation as relevant for diagnostic purposes, such as Active_Tag(<tag_name>). For example, Active_Tag (transaction_rollback).
5. Logical operators may be used to connect multiple expressions. The logical operators may include "and", "or", "not", parentheses, and the like. For example, the following expression may be connected by the logic operator "AND":
   Error_Number(<error_number>) AND Impact(Disk-Corruption)

In one embodiment, DDE rules engine 216 is configured to evaluate the set of DDE rules based upon the context data determined for the condition detected in monitored system 110. DDE rules engine 216 determines if one or more DDE rules are satisfied based upon the context data determined for the detected condition. A DDE rule is deemed satisfied if the DDE condition associated with the rule is satisfied. For example, a particular DDE rule may have an associated DDE condition expressed as Error_Number (<600>). If the context data determined for an error detected in monitored system 110 includes an associated error number 600, then the DDE condition Error_Number (<600>) is evaluated to be true and thus satisfied. As a result, the particular DDE rule is also deemed satisfied.

If the DDE condition specified in a DDE rule is satisfied based on the context data determined for the condition detected in system 110, then one or more DDE actions that are specified in that DDE rule are identified to be performed. For example, a DDE rule
  "Error_Number (<600>) AND ActiveComponent (Heap Manager)->HEAPDUMP level=1 and heaptype=UGAHEAP"

indicates a heap dump action related to the UGA heap is to be performed when the associated DDE condition "Error_Number (<600>) AND ActiveComponent (Heap Manager)" is evaluated to be true (i.e., is satisfied).

The DDE actions that are determined by DDE rules engine 216 to be performed in response to a detected condition, based upon DDE rules being satisfied, may include performing tasks that gather diagnostic data that is relevant to the detected condition. In this manner, diagnostic data that is relevant for the detected condition is gathered. The actions may also include actions for storing the gathered diagnostic data in a repository, performing one or more health checks for system 110, recommending one or more diagnostic actions to be performed, and other diagnostic related actions. In this way, by using DDE rules and the context data determined for detected conditions, DDE 112a automates the gathering of diagnostic data that is relevant to the specific conditions detected in monitored system 110. Such contextual and targeted diagnostic data dumping for a condition (including an error condition) ensures that all the required diagnostic dumps can be obtained on the first occurrence of the specific condition and only relevant diagnostic data is gathered and used for analyzing the condition. This eliminates the need for a "manual" analysis to determine which further diagnostics are needed (the further diagnostics are automatically determined and executed on the first occurrence of the failure or error). This in turn reduces the time-to-resolution of the error detected in monitored system 110.

There are two types of DDE actions that may be determined by DDE rules engines 216. The first type of DDE actions includes actions that are automatically performed once the actions are determined to be performed by DDE 112a based upon DDE rule matching. For example, in response to an error detected in monitored system 110, a DDE action identified by DDE 112a based upon DDE rules matching may be automatically executed without requiring any user intervention. In this manner, the action is automatically performed upon occurrence of the detected error.

The second type of DDE actions includes actions that are not executed automatically but are instead recommended to the user and only performed upon receiving confirmation from the user to perform the actions. Such actions are sometimes referred to as user actions since they are performed only after receiving user intervention. For example, the users may provide permission or confirmation that the action is to be performed via a user interface 208 such as a command line interface, a web-based user interface, etc. This type of DDE actions typically include actions that take a long time and/or use significant system resources. As a result, the execution of such an action automatically (as in the first type of actions) at the time of an error may adversely impact the working of monitored system 110. As a result, these actions are not performed automatically. Even though an action belonging to the second type of DDE actions is not automatically performed at the occurrence of an error, the action may be performed later using context data that is determined for the error condition when the error condition is detected. Accordingly, the action, although performed later, may still be performed as if performed automatically at the time the error condition was detected.

In this manner, by allowing the user to control the execution of such a DDE action, the possibly adverse impact to the monitored system of executing such an action at the time of the error is avoided and left to the user's control. This enables the software system to gather potentially larger sets of diagnostic data that facilitate a better understanding of the problem encountered, which in turn reduces the time-to-resolution for errors or failures detected in monitored system 110.

As depicted in FIG. 2, DDE 112a may include a flood control module 214 that is configured to control the amount of diagnostic data collected by diagnosability framework 112. In one embodiment, this is done by controlling the amount of diagnostic data gathered in response to conditions detected in monitored system 110. For example, gathering of diagnostic data in response to a condition detected in system 110 may be suppressed under certain circumstances. This may include reducing the amount of data or not gathering any diagnostic data upon the detection of the condition. The diagnostic data gathering may also be controlled by controlling the execution of diagnostic actions that are determined by DDE rules engine 216 in response to conditions detected in system 110. For example, a DDE action may not be performed if the same action has already been executed three times within an hour. In this manner, the execution of the diagnostic action is suppressed.

In one embodiment, flood control module 214 controls the amount of diagnostic data collected by diagnosability framework 112 using flood control rules configured for diagnosability framework 112. The gathering of diagnostic data may be suppressed based upon the condition that is detected and/or based upon the type of diagnostic action to be performed. Accordingly, a flood control rule may specify when diagnostic data gathering is to be suppressed for particular conditions detected in system 110 or when a diagnostic action determined by DDE rules engine 216 to be performed in monitored system 110 in response to a detected condition is to be suppressed.

For example, a flood control rule configured for monitored system 110 may specify when diagnostic data is to be gathered or suppressed in response to detection of a condition. Such a rule is sometimes referred to as a condition-related flood control rule and is used to determine whether diagnostic data is to be gathered or suppressed for an instance of that condition detected in monitored system 110. For example, a condition-related flood control rule may specify that for an error condition A, diagnostic data should be collected only once for every third occurrence of the error condition A within an hour in monitored system 110. This rule implies that, for each hour, diagnostic data gathering is suppressed for the first two occurrences of error condition A detected within an hour. Different condition-related flood control rules may be configured for different conditions detected in monitored system 110.

A flood control rule configured for monitored system 110 may specify when execution of a diagnostic action determined to be performed in response to detection of a condition is to be suppressed. Such a rule is sometimes referred to as an action-related flood control rule. For example, an action-related flood control rule may specify that for a particular diagnostic action (which may be invoked in response to detection of some condition in monitored system 110 and may be configured to gather diagnostic data for the detected condition), at most four executions of the particular action are allowed in an hour. As a result of this rule, if the particular action has already been executed four times within an hour, then all future executions of the particular action within that hour are suppressed. Suppression of execution of the particular action translates to suppression in the amount of diagnostic data that is gathered in monitored system 110. As another example, an action-related flood control rule may be configured that specifies a diagnostic action is to be suppressed if the diagnostic action is triggered by a condition that has previously triggered the same diagnostic action within a predefined time interval in monitored system 110. As a result of this rule, the diagnostic action is executed only if it is triggered by a condition that has not previously triggered the same diagnostic action within a predefined time interval., and not executed for a subsequent occurrence of the same condition. Different action-related flood control rules may be configured for different diagnostic actions capable of being performed in monitored system 110.

Accordingly, flood control engine 214 uses condition-related flood control rules and/or action-related flood control rules to determine when diagnostic data gathering is to be suppressed. Information may be logged indicating suppression of the diagnostic data gathering or suppression of the diagnostic action.

If flood control engine 214 determines, based upon condition-related flood control rules, that diagnostic data is to be gathered (i.e., is not to be suppressed) for a condition detected in system 110, flood control engine 214 sends a signal to DDE rules engine 216 to determine the one or more diagnostic actions to be performed responsive to the detected condition as discussed above. DDE rules engine 216 then determines the one or more diagnostic actions or DDE actions to be performed in monitored system 110 responsive to the detected condition. As mentioned above, a DDE action may include gathering and storing diagnostic data that is relevant to the condition (e.g., dumping of diagnostic data that is relevant to an error), running a health check to determine system related information and gather relevant diagnostic data resulting from the health check, and the like.

However, the execution of a determined diagnostic action may be suppressed based upon the action-related flood control rules. In this manner, even if the diagnostic data gathering is permitted based upon the condition-related flood control rules, the data gathering may still be suppressed based upon the action-related flood control rules. If flood control engine 214 determines that a diagnostic action determined by DDE rules engine 216 should be performed (i.e., not suppressed), then flood control engine 214 sends a signal to the appropriate component in diagnosability framework 112 to perform the action. For example, if the diagnostic action is a health check, a signal may be communicated to health monitor module 112g to carry out the health check.

In one embodiment, DDE 112a comprises a DDE action control module 215 that is configured to dynamically modify the DDE actions determined by DDE rules engine 216. DDE action control module 215 provides a mechanism to override the behavior of DDE rules dynamically by turning off actions determined by DDE rules engine 216 or enabling some pre-existing actions that are triggered by conditions detected in monitored system 110. This provides an additional tool for controlling the diagnostic actions that are executed in monitored system 110. Following is a list of example DDE controls performed by DDE action control module 208:

Enable an action for an error representing by an error number, e.g., Error (4031)→Enable StackDump.

Disable an action for an error, e.g., Error (4031)→Disable StackDump.

Delete any previously added control for an <error, action> tuple, e.g., Clear <4031, StackDump>, which means removing whatever control that is previously added for that <error, action> tuple.

Add/disable/delete actions for a class of errors, e.g., All_External_Errors→Disable StackDump.

Returning to FIG. 2, DDE actions 217 comprises one or more DDE actions determined by DDE rules engine 212 that are not suppressed by flood control module 214 or DDE action control module 215. In one embodiment, DDE actions 217 may be executed by the failing process or thread. For example, DDE 112a may send a signal to the failing process or thread to perform DDE actions 217 in the failing process or thread. In another embodiment, DDE actions 217 may be executed by some other components of diagnosability framework 112 or even by some components of monitored system 110. For example, if the DDE action is a health check, DDE 112a may send a signal to a health monitor module (not shown in FIG. 2) to perform the health check.

DDE actions 217 may also be performed in an asynchronous manner by a process or thread that is different from the failing process or thread such that the failing process or thread can continue its processing without having to wait for the diagnostic action to be completed. In one embodiment, DDE 112a may send a request to process manager 112f for initiating execution of the DDE actions in an asynchronous manner. The request may include information related to a particular diagnostic action to be performed (e.g., action name, action identifier (action ID), etc.), arguments if any for the action, and other information associated with the diagnostic action. Other components of diagnosability framework 112 may also send a request to process manager 112f for performing an action in an asynchronous manner.

Process manager 112f may receive multiple requests from DDE 112a or some other components of diagnosability framework 112 for initiating diagnostic actions asynchronously. Multiple asynchronous processes or threads may be spawned to perform multiple diagnostic actions asynchronously. Accordingly, multiple diagnostic actions may be performed in parallel by the multiple asynchronous processes or threads.

The asynchronous processes or threads spawned for performing diagnostic actions asynchronously may be monitored collectively to ensure that monitored system 110 is not adversely impacted by the executions of these diagnostics actions. The monitoring may be performed by process manager 112f. Various thresholds may be set to facilitate the monitoring and take preventive actions. For example, in one embodiment, the number of asynchronous processes or threads that are initiated is monitored and controlled such that the maximum number of asynchronous processes or threads executing in parallel in system 110 is limited to some user-configurable threshold.

The resources used by the asynchronous processes or threads may also be monitored and preventive actions taken if some related user-configurable thresholds are exceeded. For example, the time taken by the asynchronous processes or threads executing in monitored system 110, the CPU usage of the asynchronous processes or threads, and/or the memory resources used by the asynchronous processes or threads may be monitored to ensure that the resource utilization by the processes and threads does not adversely impact monitored system 110. One or more preventive actions may be taken if thresholds related to the monitored resources are reached or exceeded. In this manner, the diagnostics actions may be constrained thereby enabling proper resource management and non-intrusive gathering of diagnostic data in monitored system 110. These thresholds may be user configurable. The preventive actions may include terminating one or more of the asynchronous processes or threads. A new process or thread may be initiated for performing the diagnostic action at a later time.

In one embodiment, the context data determined for a condition detected in system 110 is used by an asynchronous process or thread scheduled to perform a diagnostic action responsive to the condition. The context data determined for the condition may be stored in a persistent memory such as diagnostic data repository 112b and/or included as arguments to the diagnostic action. For example, process manager 112f may receive the arguments representing the context data and pass the arguments to the asynchronous process or thread that is initiated for performing the action. In this manner, by using the context data determined for a condition detected in system 110, even though the diagnostic action is executed by an asynchronous process or thread that is different from the failing process or thread, the diagnostic action is executed as if the action was executed by the failing process or thread.

In this manner, by executing diagnostic actions asynchronously and by monitoring and controlling the resource utilization of the executing diagnostic actions, potential adverse impacts of performing diagnostic actions on monitored system 110 and on the failing process or thread are minimized. This enables the software system to gather potentially larger sets of diagnostic data that facilitate a better understanding of the problem encountered, which in turn reduces the time-to-resolution for errors or failures detected in monitored system 110.

The results from executing DDE actions 217 may be output and/or stored. For example, the results may be output to a user of diagnosability framework 112 or may be stored in ADR module 112b. The results from executing a DDE action may include information related to monitored system 110 that is determined and/or gathered for diagnostic purposes, such as relevant diagnostic data gathered for a specific condition detected in monitored system 110, information obtained from running a health check, information collected from executing a user action, and the like. The information and diagnostic data stored in ADR module 112b may also be displayed through a display device or system.

As mentioned previously, ADR module 112b is configured to provide a centralized repository for storing diagnostic data collected by diagnosability framework 112. In one embodiment, diagnostic data stored in ADR module 112b is stored in an hierarchical structure. For example, a root directory may be provided in ADR module 112b to represent a monitored system such as monitored system 110 and diagnostic data related to the monitored system may be stored under that directory. Multiple root directories may be provided in ADR module 112b corresponding to multiple monitored systems, which may be instances of the same product or of a different product. Directories representing multiple monitored systems may be organized under a common base directory. For example, a first directory may store diagnostic data for an instance of product X, a second directory may store diagnostic data for another instance of product X, a third directory may store diagnostic data for an instance of product Y, and so on. In this manner, diagnostic data for multiple monitored systems may be stored in one centralized location under one common base directory. Different instances of ADR module 112b may have the same general structure of a common base directory under which there are one or more root directories corresponding to multiple monitored systems. This consistent and organized manner of storing diagnostic data enables tools to navigate and extract related diagnostic information across multiple monitored systems without having specific knowledge about the structure of each individual directory that corresponds to a particular monitored system.

In addition to the root directories provided for storing diagnostic data for multiple monitored systems, a separate root directory may be provided for storing diagnostic data related to diagnosability framework 112. Diagnosability framework 112 itself is thus treated as any other monitored system. In this manner, tools and other services built as part of diagnosability framework 112 also can be used on diagnostic data gathered for diagnosability framework 112.

In one embodiment, the diagnostic data stored in a root directory that corresponds to a particular monitored system may also be hierarchically organized. In one embodiment, one or more sub-directories may be provided in the root directory corresponding to monitored system 110 for storing different types or categories of diagnostic data collected for the monitored system. For example, a subdirectory may be provided in the root directory representing monitored system 110 to store diagnostic data related to one or more incidents. As another example, a subdirectory may be provided in the root directory representing monitored system 110 to store trace data. In one embodiment, the data within each subdirectory may also be hierarchically organized.

In this manner, all the diagnostic data collected for monitored system 110 is stored in a predictable location in a structured format. The organized storage of the data enables efficient searching and querying and also enables diagnostic tools and humans to easily process the information. This along with the metadata information, as previously described, enables querying, tracking, and finding correlations between pieces of data stored in ADR module 112b (e.g., the ability to track occurrences of incidents and other events).

The organized storage of the data also enables various tools to use the diagnostic data stored in ADR module 112b. For example, tools used to navigate across multiple directories corresponding to multiple monitored systems, to search and correlate diagnostic data, to analyze diagnostic data at various levels of a software stack (e.g., look for incidents that occur for a particular "SESSION_ID" from the application level down to the physical data.

Various different types of diagnostic data may be collected and stored for monitored system 110. In one embodiment, ADR module 112b may be configured to store trace information collected for system 110 that comprises information related to process environment, statuses of processes or functions that are being executed by monitored system 110, activities such as state transitions of the processes or functions, conditions such as errors detected in monitored system 110, etc. In one embodiment, the trace information that is stored in ADR module 112b may have a common data format. This common data format facilitates searching or querying for relevant information and also enables various tools to manipulate the stored diagnostic data for diagnosis using a standard interface. In one embodiment, a tracing services component (sometimes referred to as unified trace service (UTS) in the embodiments described in the appendices) is configured to perform in-memory and disk-based tracing for gathering trace information for system 110.

In one embodiment, ADR module 112b may be configured to store information related to one or more incidents that are created in response to conditions detected in system 110. The information stored for an incident may include (1) a system-assigned unique incident identifier (ID); (2) a problem key that characterizes the incident; (3) one or more incident attributes that describe the state of the incident such as the time of occurrence of the incident, incident status such as open or closed, severity of the incident, and other attributes that describe the incident; (4) one or more correlation keys such as one or more (key, value) pairs (e.g., "key" is an arbitrary name related to some attributes of the incident such as "SESSION_ID", "PROCESS_ID", "EXECUTION_CONTEXT_ID" and "value" is a specific value that is assigned for the specific incident attribute) that can be used for correlations across multiple incidents, multiple product instances, multiple products that are managed by diagnosability framework 112, and the like; (5) metadata that describes the incident (e.g., the metadata information may include the above-described correlation keys that are used for correlation of incidents); (6) one or more incident dumps collected and stored for the incident; and other data or information related to the incident.

In one embodiment, ADR module 112b may be configured to store information related to a problem that maps to one or more incidents. The information stored for a problem may include (1) a system-defined unique identifier (problem ID) for the problem; (2) a problem key that characterizes the faulty behavior or symptom associated with the problem; (3) information that describes occurrences of incidents related to the problem including information related to the first occurrence of an incident categorized under the problem and the most recent occurrence of an incident categorized under the problem; (5) impact of the problem on the monitored system; (6) metadata that describes the problem; (7) one or more problem attributes that describe the state of the problem; and other information related to the problem.

In one embodiment, ADR module 112b may be configured to store alert messages generated in response to events in system 110. For example, an error related to the start up of a monitored database system may cause an alert message to be generated and written to ADR module 112b. In one embodiment, alert messages that are stored in ADR module 112b may have a common data format to facilitate correlation across multiple monitored systems. A tool such as a diagnostic data repository viewer tool may be used to find correlations among the stored information.

Other types of data may also be stored in ADR module 112b such as diagnostic data collected as a result of running health checks in monitored system 110, information collected as a result of executing one or more test cases (e.g., SQL test cases), information related to data repair records, etc. Various different components in diagnosability framework 112 may be configured to collect diagnostic data related to monitored system 110. In one embodiment, DDE 112a is configured to gather diagnostic data that is relevant to an incident. For example, DDE 112a may be configured to gather diagnostic data related to an incident upon occurrence or detection of a condition in monitored system 110. In another embodiment, tracing services component 112h is configured to collect diagnostic data during normal operation of monitored system 110.

In one embodiment, ADR module 112b may be configured to store information that is not generated or gathered by diagnosability framework 112. The externally generated or gathered information may be stored in one or more files and file pointers associated with the external files are stored in repository 226 to point to these files.

In one embodiment, the data stored in ADR module 112b may be stored in a database table comprising one or more fields (i.e., columns). For example, information related to an incident (e.g., incident ID, incident status, incident correlation keys) may be stored in a table. As another example, information related to a problem (e.g., problem ID, problem states, problem key, etc.) may be stored in a separate table. In one embodiment, the data stored in a table may be queried by one or more tools. For example, incidents may be tracked based on information such as "SESSION_ID" and/or the like.

In one embodiment, ADR module 112b may include one or more service components that are configured to provide various different services to support the diagnostic data stored in ADR module 112b. For example, the following components may be included:

File Service Module—This module provides one or more application programmable interfaces (APIs) to manage and navigate the directory structure in ADR module 112b and to perform basic I/O operations to ADR module 112b.

Metadata Service Module—This module supports the storage of diagnostic data in a structured format (i.e., data stored in a database table comprising one or more columns) in ADR module 112b. For example, metadata service module may store metadata information related to an incident (e.g., incident ID, incident status, incident correlation keys) in a table in ADR module 112b.

Alert Service—This module provides support for the generation and accesses to alert messages stored in ADR module 112b.

Utility Service Module—This module provides various different utility functions for the data stored in ADR module 112b. The utility functions may include (1) a function that enables a root directory corresponding to a particular monitored system (e.g., ADR_HOME directory) to be moved from a base directory (a base directory such as ADR_BASE comprises one or more root directories corresponding to multiple monitored systems) to another base directory; (2) a packaging utility that enables a portion of diagnostic data stored in a root directory representing a monitored system to be packaged and transported to another machine (e.g., diagnosis site 116); (3) an auto purging service function that enables a portion of diagnostic data stored in ADR module 112b to be automatically purged after reaching a certain age limit; and other utility functions. The age limit (or retention duration) may be configured by users. In this manner, ADR module 112b is self managing and requires very little to no intervention from users on regular maintenance chores.

Viewer Service Module—This module provides the application programmable interfaces (APIs) and tools for viewing data stored in ADR module 112b.

In one embodiment, ADR module 112b is architected such that it is available even if monitored system 110 is non-operational. For example, querying data stored in ADR module 112b for a database system does not require that the database system be up and functioning. Accordingly, ADR module 112b's availability and operation are independent of the underlying system being monitored.

ADR module 112b may also be configured to automatically partition the stored data to make the data more manageable. For example, the data stored in ADR module 112b may be partitioned based on the data size or some other criteria.

In one embodiment, ADR module 112b may be configured to be resilient to imperfect conditions that may exist in ADR module 112b. For example, if users accidentally remove a file from ADR module 112b, diagnostic tools are still be able to process the subset of intact data inside the repository. This increases the availability of the diagnostic data in ADR module 112b. Accordingly, problems associated with portions of ADR module 112b do not render the entire ADR module 112b unusable.

ADR module 112b may also be configured to repair or regenerate the data or portions of data stored in ADR module 112b. For example, if a file is inadvertently deleted from an ADR_HOME directory in ADR module 112b, ADR module 112b can detect such a deletion and regenerate the deleted file based on the trace files and other data that are stored under the ADR_HOME directory.

As depicted in FIG. 2, packaging component 112c may comprise multiple modules including a package assembler module 202 for identifying diagnostic data that is to be transmitted from diagnosability framework 112 at the system site to diagnosability framework 116 at a diagnosis site], a package review/edit module 204, and an archiving module 206 for preparing a package including the identified diagnostic data and transmitting the package to the diagnosis site.

Package assembler 202 is configured to determine the diagnostic data to be included in a package that is to be communicated to a diagnosis site. Information 211 may be provided to package assembler 202 that is used to determine the information to be included in the package. Information 211 may comprise a request to create a package for communication to a diagnosis site. In one embodiment, packages are created for one or more problems and/or incidents. In such an embodiment, information 211 may identify the one or more problems and/or incidents for which a package is to be created and communicated to the diagnosis site. An incident may be identified using an incident ID. A problem may be identified using a problem ID. A request to create a package may be received from a user of diagnosability framework 112 via user interface 208 or from a component of diagnosability framework 112.

Upon receiving a request, package assembler 202 is configured to automatically determine diagnostic data from diagnostic data repository 112b to be included in the package. For example, if the package is to be created for a problem, package assembler 202 automatically determines, from information stored in diagnostic data repository 112b, a set of incidents related to the problem and diagnostic data related to the problem and its associated incidents that is to be included in the package. In one embodiment, problem keys associated with incidents are used to identify all incidents that map to a particular problem. The problem ID associated with the problem and the incident IDs associated with the incidents are used to find the diagnostic data to be included in the package. The diagnostic data may include files, logs, dumps, traces, run reports, and the like.

In one embodiment, in addition to incidents that are directly mapped to a problem via the incident ID—problem key mapping, package assembler 202 also identifies other incidents that are considered correlated to the problem incidents. There are several ways in which incidents may be considered to be correlated such as incidents arising from the same process, incidents occurring close to each other in time, etc. Diagnostic data related to the correlated incidents is also included in the package since it may be useful in resolution of the problem.

Review/edit module 204 enables the data that is identified to be included in a package to be reviewed and, if desired, edited prior to transmission of the data to the diagnosis site. Review/edit module 204 enables a user to review and/or modify the data identified for transmission to the diagnosis site. The package data may be modified by adding additional data to the package, by removing one or more pieces of data from the data identified to be included in the package, or changing the contents of data identified for inclusion in the package. For example, if the data to be included in the package comprises sensitive or confidential data (e.g., confidential customer data, financial records data) the user may remove that data from the data to be included in the package, or alternatively replace the sensitive information with non-sensitive information.

In one embodiment, all the data that is identified to be included in the package may be presented to the user for review. The user may then manually scrub the data. For example, the user may check out the potentially sensitive information, scrub the information, and then check in the scrubbed information for transmission to the diagnosis site. Scrubbing may involve excluding information (e.g., sensitive information) from being included in the diagnostic information that is transmitted to the diagnosis site and/or replacement of the sensitive information with non-sensitive innocuous data. Sections of the package that have been modified may be tagged so that a person analyzing the data is made aware of the data modification. This information may be useful in the analysis of the diagnostic data at the diagnosis site.

Data that is considered sensitive may depend upon the system site and may also depend upon the customer/user. For example, information that comprises data blocks, bind variables, SQL statement, schema names, export dumps, etc. may be considered sensitive by a user. Other examples of data that may be considered sensitive include user names, IP addresses of customer machines, table contents, schema information, optimizer statistics, identifiers in a database (e.g., names of tables, names of procedures, etc.), and the like. In one embodiment, a user of the diagnosability framework can configure and define information that is considered sensitive by the user. In this manner, the data that is considered sensitive is user-configurable.

In another embodiment, review/edit module 204 may be configured to automatically identify data that is potentially sensitive or confidential to the customer or user of monitored system 110. For example, in one embodiment, review/edit module 204 may automatically identify portions of data that store user data (e.g., in tables, exported database data, etc.) and present the identified portions to the user for review and modification. If the identified portions indeed contain sensitive data, then the user/customer is allowed to modify that data as desired. In another embodiment, the scrubbing may be performed automatically by the diagnosability framework 112. In one embodiment, a user's/customer's preferences for handling of sensitive information may be stored in a template and used by review/edit module 204 to identify the data to be removed from the package.

According to an embodiment of the present invention, scrubbing is performed in such a manner that while the sensitive information is scrubbed and prevented from being transmitted to the diagnosis site, the non-sensitive information related to the sensitive information which is useful for diagnosis is preserved in the package and communicated to the diagnosis site. For example, while the data contents themselves may be sensitive and thus scrubbed, information related to the structure of the sensitive data, which may useful for diagnosis of the problem, may be preserved and communicated to the diagnosis site in the package. In this manner, embodiments of the present invention enable scrubbing, while preserving or maintaining information (e.g., structure information, metadata) that is relevant and useful for diagnosis.

In the manner described above, a user/customer may ensure that diagnostic data that is communicated to the diagnosis site does not include data that the user/customer does not want to be communicated to the diagnosis site. This in turn makes it more likely that sites with more rigorous security requirements (such as financial institutions, government sites, etc.) will actually allow diagnostic data to be provided to the vendor for analysis. The ease and speed with which customers can review and make changes to the package diagnostic data is also increased.

The user may also decide to add additional data to the data that is identified to be included in a package by package assembler 202. For example, the user may create test cases to better facilitate failure analysis at the diagnosis site. The user may specifically identify the test cases and the associated data to be included in the package. The user may also tag other types of diagnostic data such as logs, dumps, traces, etc. that are to be included in the data to be shipped to the diagnosis site.

In the manner above, the user at a system site has complete control over the data that is included in a package that is communicated from the system site to the diagnosis site. The modified data that is to be packaged and sent to the diagnosis site may include data identified by package assembler 202 excluding data that is identified to be removed from the package and further including data that is specifically tagged for inclusion.

Archiving module 206 is configured to package the modified data into a form suitable for transmission to the diagnosis site. In one embodiment, the modified data is zipped into a single archive package 220. The archived package 220 is then communicated to the diagnosis site. In one embodiment, for a piece of data included in the package, the location of that piece of data in diagnostic data repository 112b is preserved in the package. For example, if the package includes a file, information identifying the path to that file in diagnostic data repository 112b is preserved in the package. This facilitates unpacking of the data into diagnostic data repository 116b on the diagnosis site.

Figure 3:
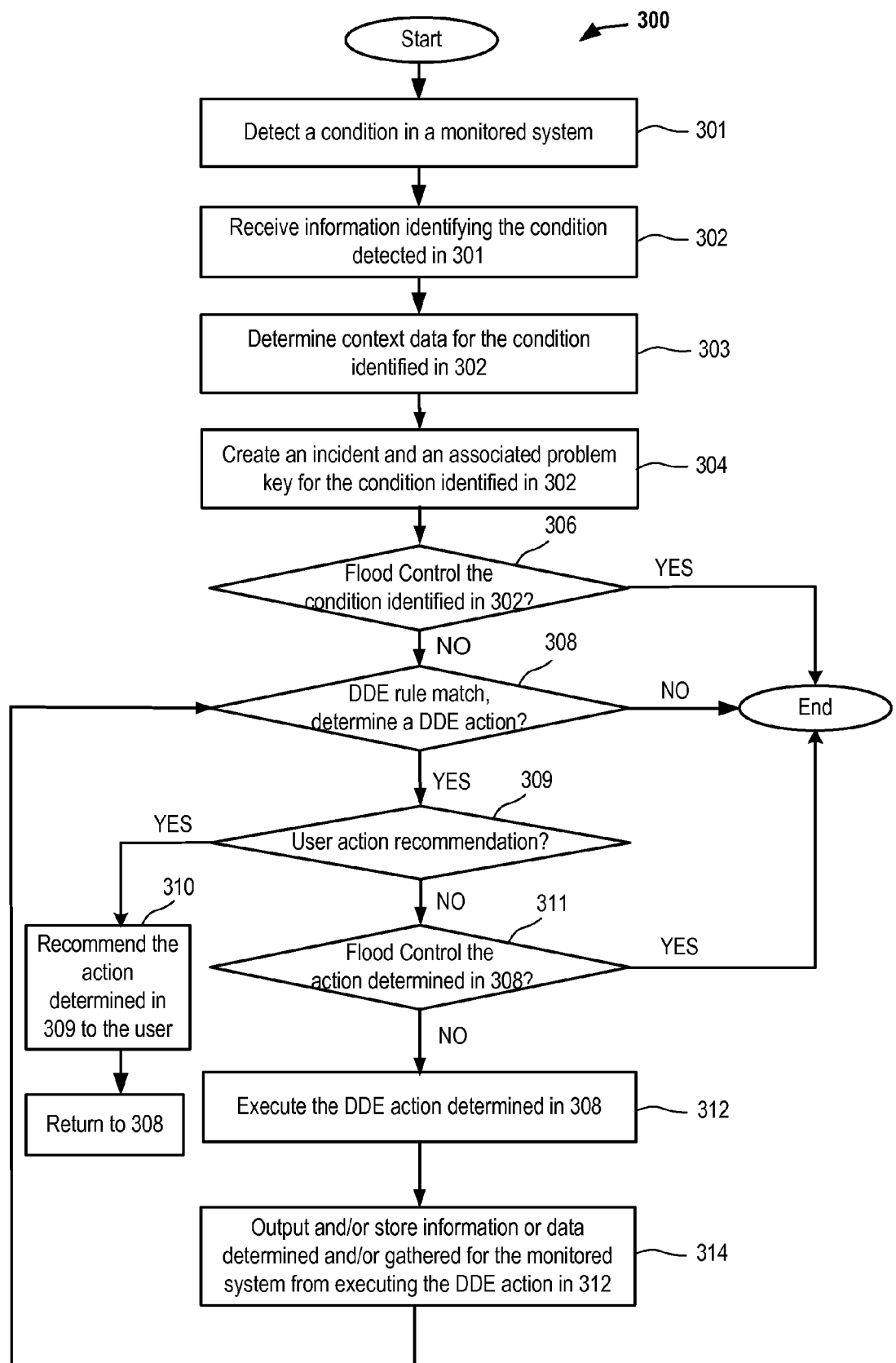
FIG. 3 is a simplified flow chart depicting a method for collecting and storing diagnostic data for a monitored system according to an embodiment of the present invention.

FIG. 3 is a simplified flow chart depicting a method for collecting and storing diagnostic data for a monitored system according to an embodiment of the present invention. The processing depicted in FIG. 3 may be performed by software (executed by a processor), hardware, or combinations thereof.

Referring to FIG. 3, at 301, a condition is detected in a monitored system such as monitored system 110. The condition detected in 301 may include an error condition detected in the monitored system. The condition detected in 301 may be detected by DDE 112a or by some other components of diagnosability framework 112.

At 302, information is received identifying the condition detected in 301. The information received in 302 may include information identifying the detected condition and related information such as an error number and one or more error arguments associated with the detected condition. In one embodiment, the information in 302 may be received by DDE 112a.

At 303, context data is determined for the condition identified in 302. The context data determined for the condition identified in 302 may include information related to the condition detected in 301 such as error number and error arguments, information related to system components on the call stack, information provided by active state module 112e such as information related to tagged function or process, and the like. In one embodiment, the context data determined in 303 is provided to or accessed by DDE 112a.

At 304, an incident is generated and a problem key is associated with the incident. In one embodiment, the incident created in 304 is mapped to a problem based on its problem key.

At 306, processing is performed to determine if diagnostic data is to be gathered for the condition identified in 302. This is determined based upon one or more condition-related flood control rules configured for the monitored system. For example, a flood control rule "error default skip 3 do 4 repeat 2, limit 6, reset 1 hour" may be configured for monitored system 110 for the condition detected in 301. According to the rule, diagnostic data gathering is skipped for the first three occurrences of a condition and for the 8th, 9th, and 10th occurrences of the condition with an hour, and diagnostic data is gathered on the 4th, 5th, 6th, 7th, 11th, 12th occurrences of the condition within the hour. Further, assume that the number of past occurrences of the condition within an hour is 6 times. Based upon this information, it is determined that diagnostic data should be gathered for the condition identified in 302 (since the condition identified in 302 is the 7th occurrence of that condition within an hour for which diagnostic data should be gathered).

If processing in 306 determines that, based upon the flood control rule determined for the condition, gathering of diagnostic data is to be suppressed for the condition identified in 302, then no further action is taken and processing ends. In this manner, diagnostic data gathering for the condition identified in 302 is controlled. Information related to the condition identified in 302 may be logged indicating suppression of the diagnostic data gathering for the detected condition.

If it is determined that diagnostic data gathering is permitted for the detected condition in 301, then at 308, one or more DDE rules are evaluated, based upon the context data determined in 303, to determine one or more DDE actions to be performed. As described previously DDE 112a is a rule-based engine with each DDE rule identifying a DDE condition and one or more DDE actions to be performed when the DDE condition is met based on the context data determined for the condition identified in 302. The actions that are determined in 308 may include gathering relevant diagnostic data for the condition identified in 302 that triggered evaluation of the DDE rules and invocation of the actions, recommending a user action to a user, and other diagnostic related actions. As part of 308, processing is performed to identify one or more DDE rules that are matched based upon the context data collected in 303, and one or more actions specified by the matched DDE rules are identified as actions to be performed.

Processing of a diagnostic action determined in 308 depends upon whether the action is a user action to be recommended to a user (i.e., an action that requires user intervention in the form of providing permission or confirming execution) or a non-user action that may be automatically performed. At 309, processing determines whether the diagnostic action determined in 308 is a user action recommendation. If it determines that the diagnostic action determined in 308 is a user action recommendation, then the action determined in 308 is recommended to a user at 310. The user action determined in 309 is performed only after receiving user permission or confirmation. The user action may be performed using context data determined in 303. Processing may be returned to 308 when there are more than one DDE rules to evaluate.

For non-user actions, processing is performed at 311 to determine if the diagnostic action determined in 308 is to be performed or suppressed based upon one or more action-related flood control rules. For example, assume that an action-related flood control rule "action DictionaryDump skip 2 do 2 repeat 2, limit 6, reset 1 hour" is specified for a diagnostic action in system 110. According to the rule, a diagnostic action is skipped for the first two occurrences and for the 5th and 6th occurrences of the action within an hour, and the action is executed on the 3rd and 4th occurrences of the action with the hour. Further assume that the number of past occurrences of the diagnostic action within an hour is 5 times. Based upon these pieces of information, processing at 314 may determine that the present execution of the diagnostic action should be suppressed because it is the 6th occurrence of that action within the hour.

If processing in 311 determines that diagnostic action determined in 308 is to be suppressed, then no further action is taken and processing ends. The flood control rules thus enable diagnostic data collection to be intelligently controlled such that redundant or non-relevant diagnostic data gathering is minimized and adverse impacts, if any, of the gathering on the monitored system are also minimized. Information may be logged indicating suppression of the diagnostic action.

If it is determined in 311 that a diagnostic action determined in 308 is not to be suppressed, then at 312, the diagnostic action is executed either synchronously or asynchronously as discussed previously.

At 314, results from executing the one or more diagnostic actions in 312 may be output and/or stored. The results from executing a DDE action may include information related to monitored system 110 that is determined and/or gathered for diagnostic purposes, such as relevant diagnostic data gathered for the condition identified in 302 that triggered the DDE action. In one embodiment, the results from executing a DDE action may be displayed to a user via a display device (optional). The results from executing a DDE action may be stored in diagnostic data repository 112b. Processing may be returned to 308 when there are more than one DDE rules to evaluate.

Figure 4:
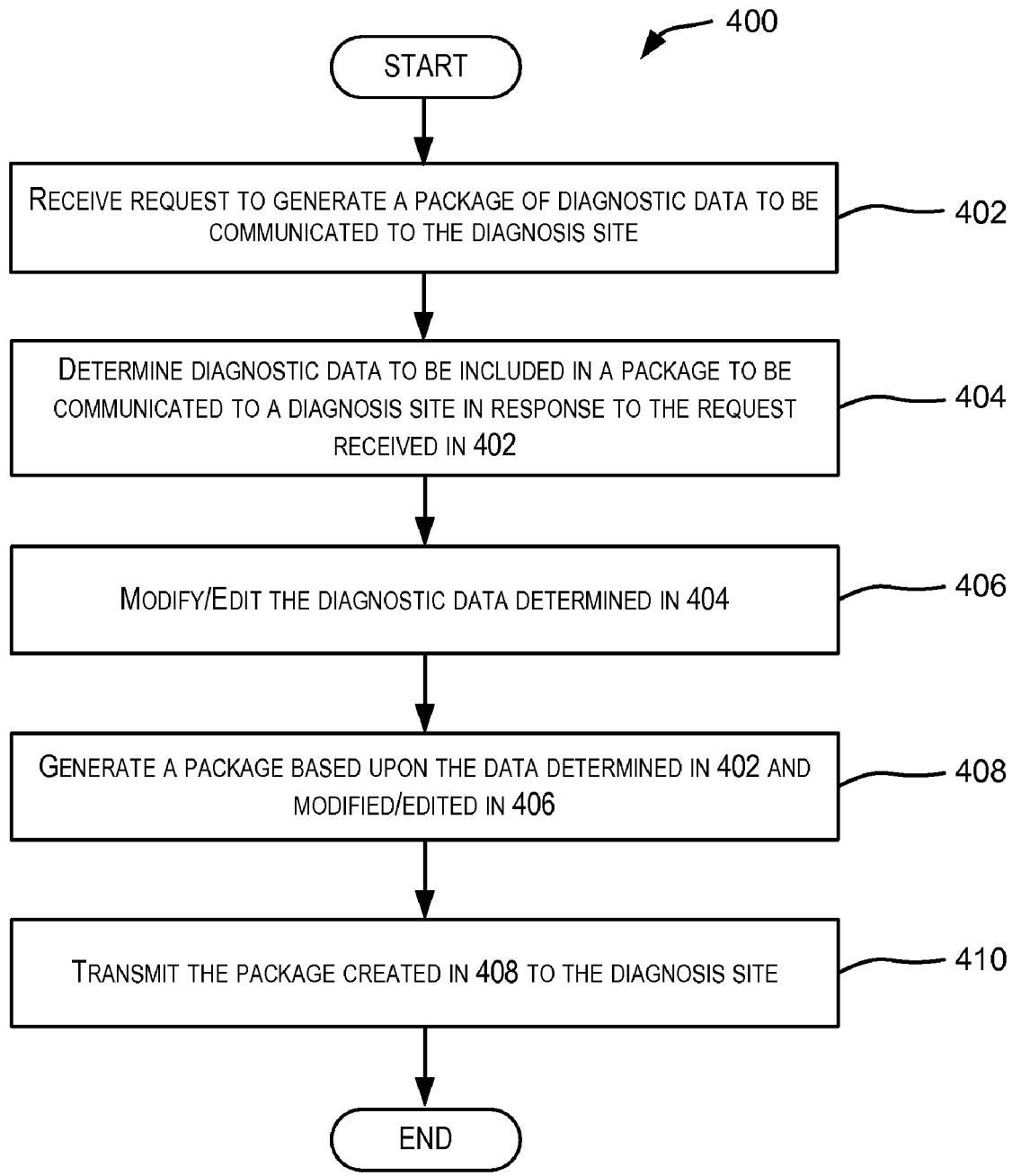
FIG. 4 is a simplified flow chart depicting a method for generating and communicating a package of diagnostic data from a system site to a diagnosis site according to an embodiment of the present invention.

FIG. 4 is a simplified flow chart depicting a method for generating and communicating a package of diagnostic data from a system site to a diagnosis site according to an embodiment of the present invention. The processing depicted in FIG. 4 may be performed by software (executed by a processor), hardware, or combinations thereof.

Referring to FIG. 4, at 402, information is received requesting generation of a package of diagnostic data to be communicated from the system site to a diagnosis site. For example, information may be received requesting generation of a package for a specific problem. The problem may be identified using a problem ID or problem key associated with the problem. The information may be received from a user or from some component of diagnosability framework 112.

At 404, processing determines the diagnostic data to be included in a package to be communicated from the system site to a diagnosis site in response to the request received in 402. For example, if information received in 402 requests generation of a package for a problem, then a set of incidents are identified based upon the problem identified in the request. The problem keys associated with the incidents and the problem ID of the problem may be used to identify the set of incidents that map to the problem. For example, incidents that have the same problem key that matches the problem key of the problem identified in the request received in 402 are identified in 404.

A set of incidents correlated to the incidents that map to the problem is also identified. For example, when examining an incident to diagnose a problem, it may be helpful to also examine incidents that occurred within five minutes of the original incident. Various criteria may be used to determine correlated incidents. For example, the correlation keys stored in metadata associated with the incidents may be used to find correlated incidents including keys related to time of occurrence, process, session, execution context ID, and the like.

In this manner, the diagnostic data to be included in a package is identified based upon the problem and incidents identified. In one embodiment, the diagnostic data stored in ADR module 112b for each of the incidents may be included in a package such as files generated for the selected incidents, process trace files for the selected incidents, background traces, logs, results of health checks related to the incidents, dumps generated for the incidents, status reports, and the like.

At 406, processing is performed to review and/or modify the diagnostic data that is determined to be included in a package in 404. Information may be received identifying modifications, if any, made to the diagnostic data determined to be included in a package in 404. As previously described, the modifications may include deletion of one or more pieces of data from the diagnostic data determined to be included in a package in 404, replacement of data, and/or addition of additional data to the diagnostic data determined to be included in a package in 404. For example, sensitive data included in the diagnostic data determined to be included in a package in 404 may be removed from or replaced with non-sensitive data. It should be noted that when data included in a package is modified, the modification does not affect the actual data stored in ADR module 112b. The diagnostic data to be included in a package may be modified by adding additional data to the package. Examples of information that may be added to the package may include trace files not associated with any incident identified in 404, test cases created by the user, additional dumps taken by the user, configuration information identified for inclusion in the package, and so on.

Based upon the diagnostic data determined to be included in a package in 404 and the modifications, if any, performed in 406, a package is generated at 408. In one embodiment, the package generated in 408 may include the diagnostic data determined to be included in a package in 404 and modifications made to the package data including removal of data, data replacements, and inclusion of additional data.

The processing in 408 may be performed by archiving module 206 depicted in FIG. 2. In one embodiment, the package is generated as a single archive using utilities such as "zip", "tar", etc. A utility such as "compress" may also be used to reduce the size of files included in the archives In one embodiment, for a piece of data included in the package, the location of that piece of data in ADR module 112b is preserved in the package. For example, if the package includes a file, information identifying the path to that file in ADR module 112b is stored in the package. This facilitates unpackaging of the data into diagnostic data repository 116b on the diagnosis site. In one embodiment, the structure within ADR module 112b is also preserved within the package generated in 408. The package generated in 408 may thus be considered as a subset of diagnostic data stored in ADR module 112b.

In addition to generating a package of diagnostic data, a manifest file may also be generated in 408 to be included in the package. The manifest file is generally a text file that describes the package contents (e.g., may comprise a table of contents identifying the contents included in the package). The manifest file may also comprise instructions for unpacking and processing the contents of the package. For example, the manifest file may comprise information such as a list of files included in the package along with timestamp, size information, reasons for including the files in the package, information identifying the problem and incidents included in the package, correlation keys used to pick related incidents, user actions executed for the problem and related incidents, and the like.

The package prepared in 408 is then transmitted to the diagnosis site from the system site (Step 410). The package may be transmitted to the diagnosis site after the package has been created or at some later scheduled time.

Figure 5:
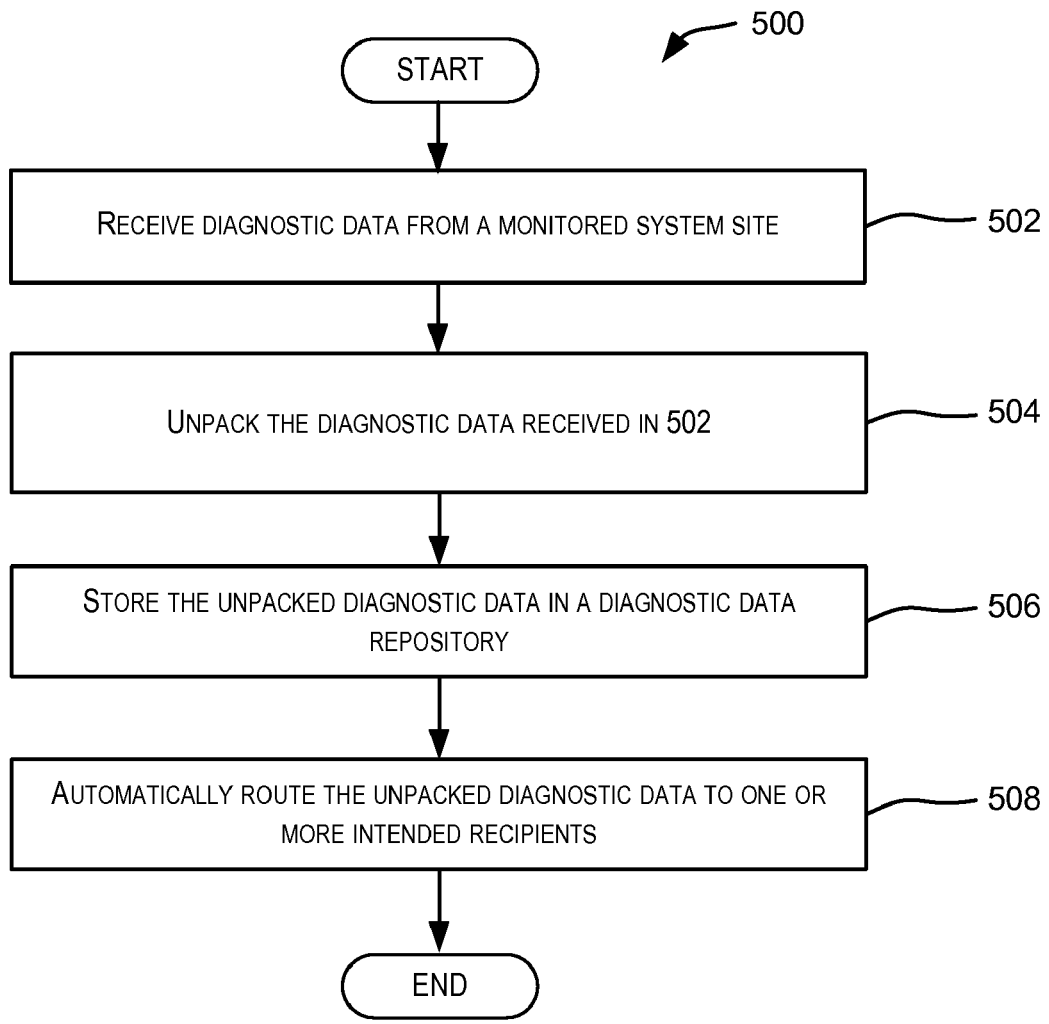
FIG. 5 is a simplified flow chart depicting a method for unpacking and storing a package of diagnostic data received from a system site at a diagnosis site and communicating the unpackaged diagnostic data to one or more intended recipients according to an embodiment of the present invention.

FIG. 5 is a simplified flow chart depicting a method for unpacking and storing a package of diagnostic data received from a system site at a diagnosis site and communicating the unpackaged diagnostic data to one or more intended recipients according to an embodiment of the present invention. The processing depicted in FIG. 5 may be performed by software (executed by a processor), hardware, or combinations thereof.

Referring to FIG. 5, at 502, a package of diagnostic data is received from a monitored system site at a diagnosis site. For example, unpacking component 116a of diagnosability framework 116 is configured to receive the diagnostic data transmitted from diagnosability framework 112. Alternatively, the package of diagnostic data may be received by some other components of diagnosability framework 116.

At 504, the package of diagnostic data received in 502 is unpacked. For example, unpacking component 116a of diagnosability framework 116 is configured to unpack the diagnostic data and make the unpacked data available for analysis at the diagnosis site. In one embodiment, the data is unpacked into a format that can be consumed by users at the diagnosis site. For example, if the diagnosis site is Oracle, the data may be unpackaged into a form that can be consumed by developers and Oracle support personnel who are responsible for providing support for the monitored system.

At 506, the unpackaged diagnostic data is stored. For example, the diagnostic data is unpackaged into diagnostic data repository 116b. Diagnostic data repository 116b thus provides a repository for storing data received from one or more system sites. In one embodiment, the structure of diagnostic data repository 116b is the same as the structures of diagnostic data repositories at system sites. This facilitates efficient storage and analysis of the data. In such an embodiment, data from a received package is unpacked and stored in the same directory location in diagnostic data repository 116b as the data was stored in diagnostic data repository 112b.

At 508, the unpackaged diagnostic data is automatically routed to one or more intended recipients (e.g., a particular group or department responsible for the software that experienced the error, one or more software developers responsible for solving the error, a system administrator, etc.) for diagnosis. In one embodiment, unpacking component 116a is configured to route the unpackaged data to one or more recipients responsible for analyzing the data. Various tools 116c may be provided in diagnosability framework 116 to help automatically route the unpackaged diagnostic data to a correct entity for diagnosis. For example, these tools may include command line or GUI-based tools for use by personnel at the diagnosis site to analyze the diagnostic data received from diagnosability framework 112 and to guide management and resolution of problems and errors in monitored systems.

Figure 6:
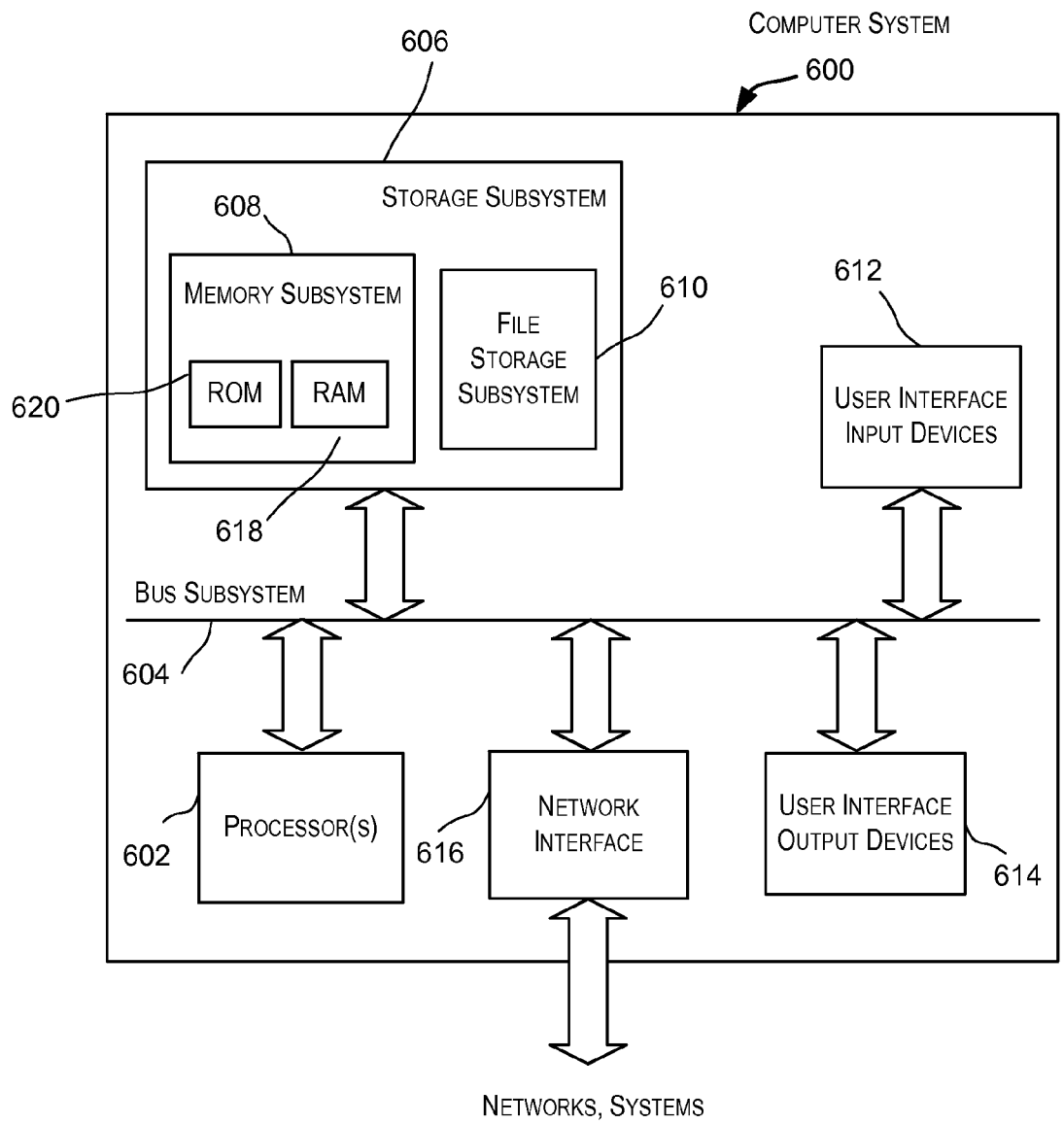
FIG. 6 is a simplified block diagram of a computer system that may be used to practice an embodiment of the various inventions described in this application.

FIG. 6 is a simplified block diagram of a computer system that may be used to practice an embodiment of the various inventions described in this application. Computer system 600 may serve as the platform for the diagnosability frameworks depicted in FIG. 1. For example, a computer system 600 at the monitored system site may serve as a platform for diagnosability framework 112. A computer system 600 located at a diagnosis site may serve as a platform for diagnosability framework 116. A diagnosability framework may also be distributed across multiple computer systems.

As shown in FIG. 6, computer system 600 includes a processor 602 that communicates with a number of peripheral subsystems via a bus subsystem 604. These peripheral subsystems may include a storage subsystem 606, comprising a memory subsystem 608 and a file storage subsystem 610, user interface input devices 612, user interface output devices 614, and a network interface subsystem 616.

Bus subsystem 604 provides a mechanism for letting the various components and subsystems of computer system 600 communicate with each other as intended. Although bus subsystem 604 is shown schematically as a single bus, alternative embodiments of the bus subsystem may utilize multiple busses.

Network interface subsystem 616 provides an interface to other computer systems, networks, and portals. Network interface subsystem 616 serves as an interface for receiving data from and transmitting data to other systems from computer system 600. For example, for the diagnosability framework deployed at the customer site or site where the software system is deployed, network interface subsystem 616 may be configured to transfer diagnostic packages from the customer site to the vendor or diagnosis site.

User interface input devices 612 may include a keyboard, pointing devices such as a mouse, trackball, touchpad, or graphics tablet, a scanner, a barcode scanner, a touch screen incorporated into the display, audio input devices such as voice recognition systems, microphones, and other types of input devices. In general, use of the term "input device" is intended to include all possible types of devices and mechanisms for inputting information to computer system 600.

User interface output devices 614 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 600.

Storage subsystem 606 provides a computer-readable medium for storing the basic programming and data constructs that provide the functionality of the present invention. Software (code modules or instructions) that provides the functionality of the present invention may be stored in storage subsystem 606. These software modules or instructions may be executed by processor(s) 602. Storage subsystem 606 may also provide a repository for storing data used in accordance with the present invention such as the diagnostic data repository. Storage subsystem 606 may comprise memory subsystem 608 and file/disk storage subsystem 610.

Memory subsystem 608 may include a number of memories including a main random access memory (RAM) 618 for storage of instructions and data during program execution and a read only memory (ROM) 620 in which fixed instructions are stored. File storage subsystem 610 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Computer system 600 can be of various types including a personal computer, a portable computer, a workstation, a network computer, a mainframe, a kiosk, a server or any other data processing system. Due to the ever-changing nature of computers and networks, the description of computer system 600 depicted in FIG. 6 is intended only as a specific example for purposes of illustrating the preferred embodiment of the computer system. Many other configurations having more or fewer components than the system depicted in FIG. 6 are possible.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps. While the embodiments of the diagnosability framework have been described as providing diagnostic support for software product instances, in alternative embodiments, embodiments of the present invention may be used for providing diagnostic support for software products, hardware products, or products having combination of software and hardware.

Further, while the present invention has been described using a particular combination of hardware and software, it should be recognized that other combinations of hardware and software are also within the scope of the present invention. The present invention may be implemented using hardware, software, or combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the inventions.

What is claimed is:

1. A method for processing diagnostic data in a monitored system, comprising:
    detecting, by a computer system, a condition in the monitored system;
    determining, by the computer system, context data for the detected condition;
    determining, by the computer system, a diagnostic action to be performed in response to the detected condition, the diagnostic action determined based upon the context data and a set of one or more rules configured for the monitored system;
    gathering, by the computer system, diagnostic data relevant to the condition by executing the diagnostic action;
    storing, by the computer system, the diagnostic data in a diagnostic data repository;
    determining, by the computer system, a portion of the diagnostic data to be sent to a diagnosis site, the portion of the diagnostic data pertaining to incidents that are correlated with the detected condition;
    preparing, by the computer system a package comprising the portion of the diagnostic data determined; and
    communicating, by the computer system, the package to the diagnosis site.

2. The method of claim 1 wherein determining the context data comprises:
    determining information related to the detected condition in the monitored system;
    determining information related to functions or processes that are being executed in the monitored system;
    determining information related to a tagged function or process; and
    determining information related to an impact that the detected condition has on the monitored system.

3. The method of claim 1 wherein:
    each rule in the set of one or more rules specifies a condition and one or more actions to be performed when the condition specified in the rule is satisfied; and
    wherein determining the diagnostic action to be performed comprises determining that the condition associated with a first rule from the set of rules is satisfied by the context data determined, wherein at least one action specified by the first rule is the diagnostic action determined to be performed in the monitored system.

4. The method of claim 1 further comprising
    outputting information recommending execution of the diagnostic action; and
    executing the diagnostic action only upon receiving an input from a user to execute the diagnostic-related action, wherein the diagnostic action is executed using the context data determined for the detected condition.

5. The method of claim 1 wherein determining the context data comprises:
    gathering information related to the monitored system during runtime of the monitored system;
    storing the gathered information during runtime of the monitored system;
    retrieving a portion of the stored information in response to the condition detected in the monitored system; and
    wherein the retrieved information is used for determining the diagnostic actions to be performed in response to the detected condition.

6. The method of claim 1 further comprising:
    determining a first rule for the condition detected in the monitored system, the first rule specifying when diagnostic data gathering is to be suppressed or allowed upon occurrence of the detected condition;
    determining, based upon the first rule, if gathering of diagnostic data for the condition detected in the monitored system is to be suppressed; and
    wherein gathering of diagnostic data for the detected condition is suppressed upon determining that gathering of diagnostic data for the detected condition is to be suppressed.

7. The method of claim 6 further comprising:
    determining a second rule for the diagnostic action determined to be performed in response to the condition detected in the monitored system, the second rule specifying when execution of the diagnostic action is to be suppressed or allowed;
    determining, based upon the second rule, if execution of the diagnostic action is to be suppressed; and
    wherein gathering of diagnostic data for the condition detected in the monitored system is suppressed upon determining that the execution of the diagnostic action is to be suppressed.

8. The method of claim 1 further comprising:
    receiving indication of the condition from a first process or thread in the monitored system;
    initiating a second process or thread to perform the determined diagnostic action; and
    executing the determined diagnostic action in the second process or thread, wherein the first process or thread can continue processing without being delayed or interrupted by the execution of the diagnostic action in the second process.

9. The method of claim 1 further comprising:
    executing a health check to determine information related to the monitored system, the health check invoked based upon a predefined schedule or in response to the condition detected in the monitored system; and
    outputting the information related to the monitored system determined from executing the health check.

10. The method of claim 1 further comprising:
    storing diagnostic data related to a first monitored system in a first directory in the diagnostic data repository;
    storing diagnostic data related to a second monitored system in a second directory in the diagnostic data repository; and
    storing the first directory and the second directory under a common directory in the diagnostic data repository.

11. The method of claim 1 wherein storing the diagnostic data comprises:
  storing metadata information, the metadata information including one or more correlation keys;
  storing information related to one or more health checks for the monitored system;
  storing information related to packaged diagnostics that is to be communicated to the diagnosis site; and
  storing information related to one or more incidents for the monitored system.

12. The method of claim 1 wherein determining a portion of the diagnostic data to be sent to the diagnosis site further comprising:
  receiving a request to create a package to be communicated to the diagnosis site;
  identifying a first set of one or more incidents based upon the request, each incident corresponding to an error detected in the monitored system;
  identifying a second set of incidents correlated to the first set of incidents;
  determining diagnostic data for the first set of incidents and the second set of incidents; and
  preparing a package comprising the diagnostic data determined for the first set of incidents and the second set of incidents.

13. The method of claim 1 further comprising modifying the portion of the diagnostic data included in the package prior to communication of the package to the diagnosis site.

14. The method of claim 1 further comprising generating an incident and an associated problem key in response to the condition detected in the monitored system.

15. A computer-readable storage medium storing a plurality of instructions for controlling a processor to process diagnostic data in a monitored system, the plurality of instructions comprising:
  instructions that cause the processor to detect a condition in the monitored system;
  instructions that cause the processor to determine context data for the detected condition; and
  instructions that cause the processor to determine a diagnostic action to be performed responsive to the detected condition based upon the context data determined and based upon a set of one or more rules configured for the monitored system;
  instructions that cause the processor to gather diagnostic data relevant to the condition by executing the diagnostic action;
  instructions that cause the processor to store the diagnostic data in a diagnostic data repository;
  instructions that cause the processor to determine a portion of the diagnostic data to be sent to a diagnosis site, the portion of the diagnostic data pertaining to incidents that are correlated with the detected condition;
  instructions that cause the processor to prepare a package comprising the portion of the diagnostic data determined; and
  instructions that cause the processor to communicate the package to the diagnosis site.

16. The computer readable storage medium of claim 15 wherein the instructions that cause the processor to determine the context data for the detected condition comprise:
  instructions that cause the processor to determine information related to the detected condition in the monitored system;
  instructions that cause the processor to determine information related to functions or processes that are being executed in the monitored system;
  instructions that cause the processor to determine information related to a tagged function or process; and
  instructions that cause the processor to determine information related to an impact that the detected condition has on the monitored system.

17. The computer readable storage medium of claim 15 wherein:
  each rule in the set of one or more rules specifies a condition and one or more actions to be performed when the condition specified in the rule is satisfied; and
  wherein the instructions that cause the processor to determine the diagnostic action to be performed comprises instructions that cause the processor to determine that the condition associated with a first rule from the set of rules is satisfied by the context data determined, wherein at least one action specified by the first rule is the diagnostic action determined to be performed in the monitored system.

18. The computer readable storage medium of claim 15 wherein the plurality of instructions further comprise:
  instructions to cause the processor to output information recommending execution of the diagnostic action; and
  instructions to cause the processor to execute the diagnostic action only upon receiving an input from a user to execute the diagnostic-related action, wherein the diagnostic action is executed using the context data determined for the detected condition.

19. The computer readable storage medium of claim 15 wherein the plurality of instructions further comprise:
  instructions to cause the processor to receive indication of the condition from a first process or thread in the monitored system;
  instructions to cause the processor to initiate a second process or thread to perform the determined diagnostic action; and
  instructions to cause the processor to execute the determined diagnostic action in the second process or thread, wherein the first process or thread can continue processing without being delayed or interrupted by the execution of the diagnostic action in the second process.

20. A system for processing diagnostic data in a monitored system, the system comprising:
  a memory; and
  a processor coupled to the memory;
  wherein the processor is configured to:
    detect a condition in the monitored system;
    determine context data for the detected condition; and
    determine a diagnostic action to be performed responsive to the detected condition based upon the context data determined and based upon a set of one or more rules configured for the monitored system;
    gather diagnostic data relevant to the condition by executing the diagnostic action;
    store the diagnostic data in a diagnostic data repository;
    determine a portion of the diagnostic data to be sent to a diagnosis site, the portion of the diagnostic data pertaining to incidents that are correlated with the detected condition;
    prepare a package comprising the portion of the diagnostic data determined; and
    communicate the package to the diagnosis site.

* * * * *

UNITED STATES PATENT AND TRADEMARK OFFICE
CERTIFICATE OF CORRECTION

| | | |
|---|---|---|
| PATENT NO. | : 7,937,623 B2 | |
| APPLICATION NO. | : 12/252056 | |
| DATED | : May 3, 2011 | |
| INVENTOR(S) | : Ramacher et al. | |

It is certified that error appears in the above-identified patent and that said Letters Patent is hereby corrected as shown below:

On title page, item [75] under "Inventors", line 13, delete "Balasubrahmanya" and insert -- Balasubrahmanyam --, therefor.

In column 30, line 31, delete "archives" and insert -- archive. --, therefor.

In column 33, line 43, in Claim 1, delete "system" and insert -- system, --, therefor.

Signed and Sealed this
Fourth Day of October, 2011

David J. Kappos
*Director of the United States Patent and Trademark Office*